US011062125B2

(12) United States Patent
Ishii

(10) Patent No.: US 11,062,125 B2
(45) Date of Patent: Jul. 13, 2021

(54) FACIAL FEATURE DETECTING APPARATUS AND FACIAL FEATURE DETECTING METHOD

(71) Applicant: ALPINE ELECTRONICS, INC., Tokyo (JP)

(72) Inventor: Takuya Ishii, Tokyo (JP)

(73) Assignee: ALPINE ELECTRONICS, INC., Tokyo (JP)

(*) Notice: Subject to any disclaimer, the term of this patent is extended or adjusted under 35 U.S.C. 154(b) by 0 days.

(21) Appl. No.: 16/804,266

(22) Filed: Feb. 28, 2020

(65) Prior Publication Data

US 2020/0285834 A1 Sep. 10, 2020

(30) Foreign Application Priority Data

Mar. 5, 2019 (JP) .............................. JP2019-039902

(51) Int. Cl.
*G06K 9/00* (2006.01)
*G06T 17/00* (2006.01)

(52) U.S. Cl.
CPC ..... *G06K 9/00255* (2013.01); *G06K 9/00241* (2013.01); *G06K 9/00832* (2013.01); *G06T 17/00* (2013.01)

(58) Field of Classification Search
CPC ........... G06K 9/00255; G06K 9/00241; G06K 9/00832; G06T 17/00
USPC .......................................................... 382/100
See application file for complete search history.

(56) References Cited

U.S. PATENT DOCUMENTS

| 2003/0206171 | A1* | 11/2003 | Kim ........................ G06T 11/00 345/473 |
| 2006/0078172 | A1* | 4/2006 | Zhang ................ G06K 9/00268 382/118 |
| 2016/0217318 | A1* | 7/2016 | Hayasaka .......... G06K 9/00288 |

FOREIGN PATENT DOCUMENTS

JP 2015-231063 12/2015

OTHER PUBLICATIONS

Masaharu Nishimura et al., "Active Noise Control", Japan, Corona Publishing Co.,Ltd., Oct. 6, 2017,with partial English translation.

* cited by examiner

*Primary Examiner* — Wednel Cadeau
(74) *Attorney, Agent, or Firm* — IPUSA, PLLC

(57) ABSTRACT

A facial feature detecting apparatus includes a feature sensor configured to acquire information on facial features of a subject; a feature detecting unit configured to detect the facial features of the subject from the information acquired by the feature sensor; a three-dimensional coordinates calculating unit configured to calculate three-dimensional coordinates of the facial features of the subject; and a feature position estimating unit configured to estimate first three-dimensional coordinates of a first facial feature from second three-dimensional coordinates of a second facial feature of the detected facial features, on a basis that the first facial feature and the second facial feature are located at bilaterally symmetrical positions.

7 Claims, 21 Drawing Sheets

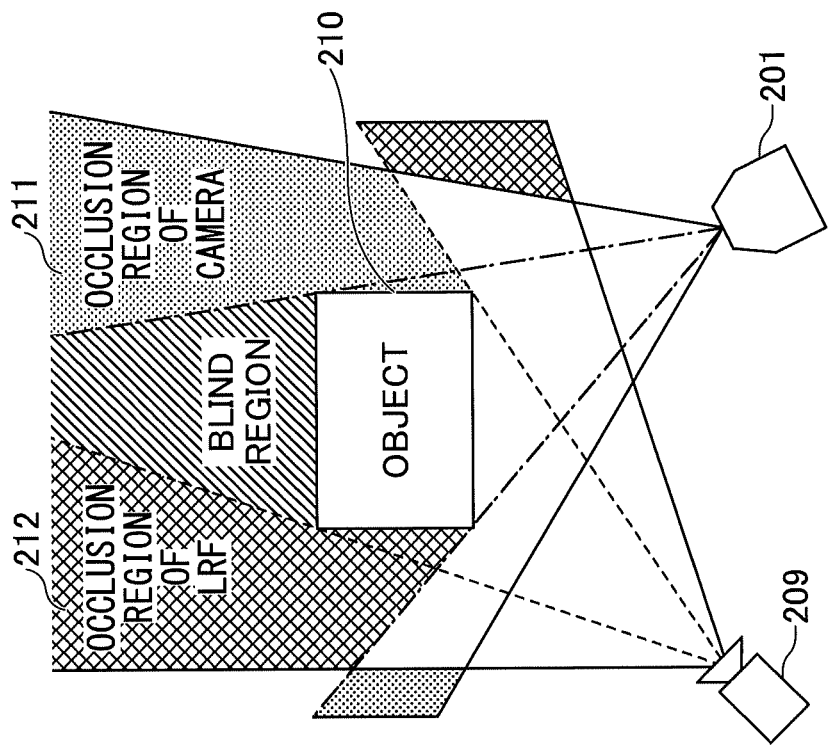
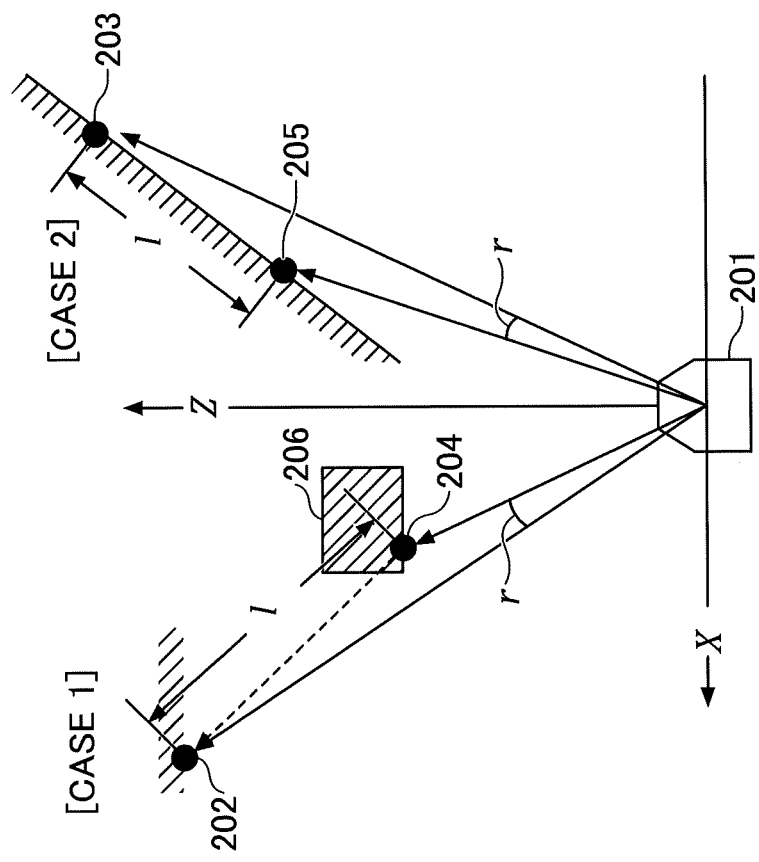
FIG.2A
FIG.2B

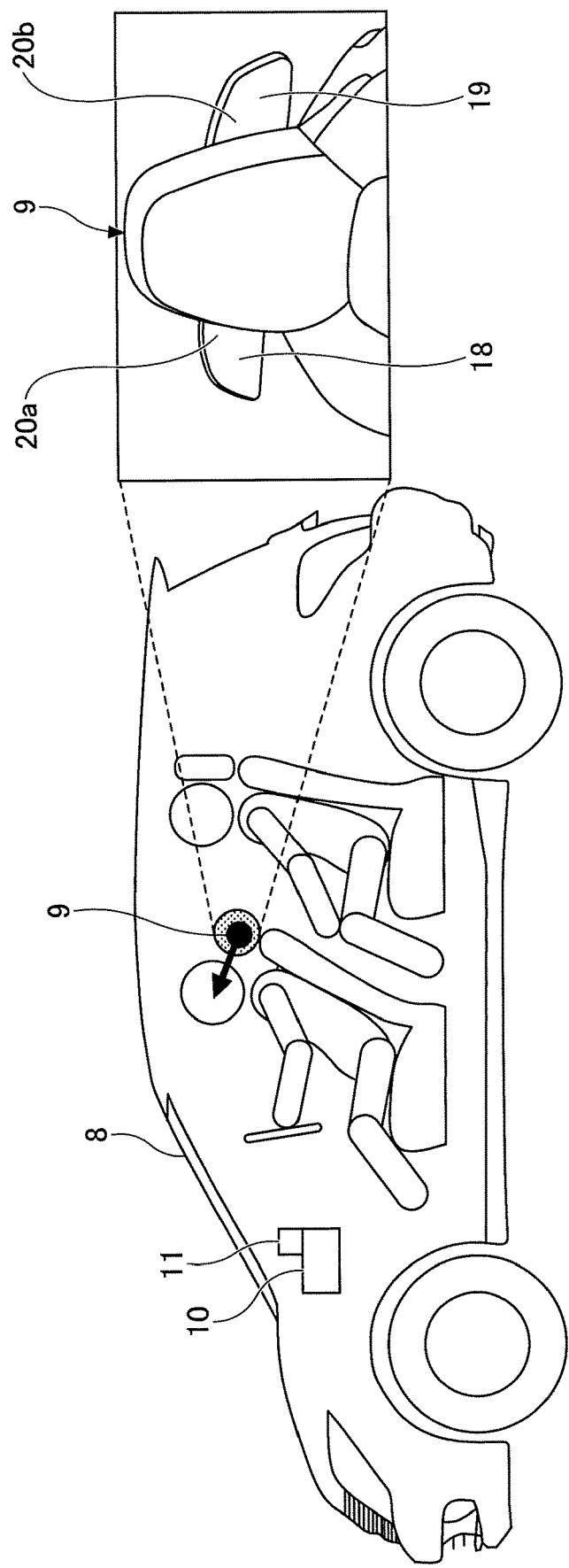

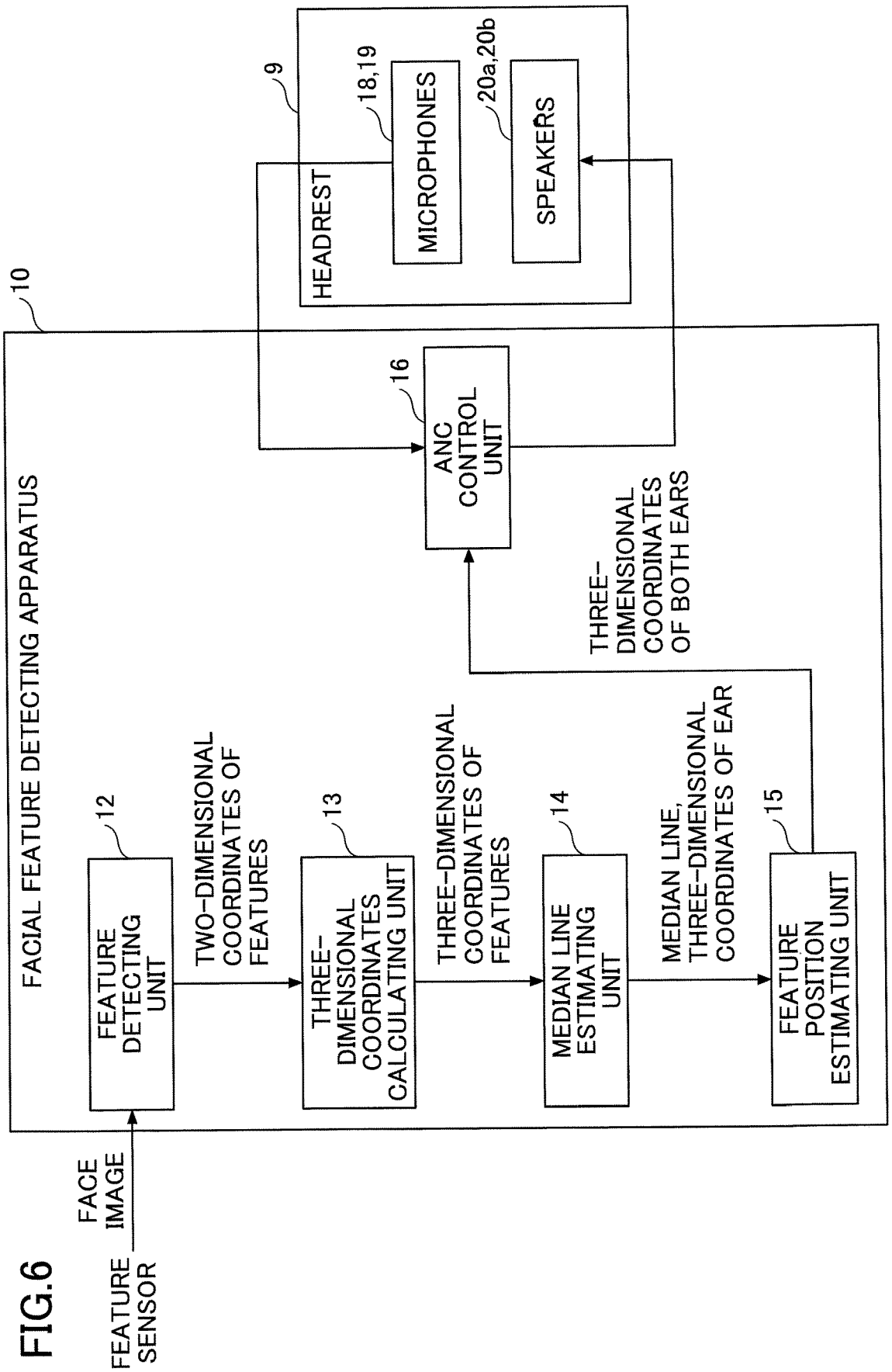

PITCH

ROLL

YAW

FACIAL FEATURE DETECTING APPARATUS AND FACIAL FEATURE DETECTING METHOD

CROSS-REFERENCE TO RELATED APPLICATIONS

This application is based on and claims priority to Japanese Patent Application No. 2019-039902, filed on Mar. 5, 2019, the entire contents of which are incorporated herein by reference.

BACKGROUND OF THE INVENTION

1. Field of the Invention

The disclosures herein relate to a facial feature detecting apparatus and a facial feature detecting method.

2. Description of the Related Art

There are noise sources in automobiles, including roadway noise and engine noise, and it is desired to reduce noise perceived by occupants. However, due to a variety of restrictions inside the automobiles, there are limitations in reducing noise by means of passive noise control, such as noise absorption and noise insulation. Therefore, the utilization of active noise control (ANC) that uses speakers and microphones to reduce noise perceived by occupants has been attempted. ANC in which speakers and microphones are installed on a headrest, which is located near an occupant's ears, is hereinafter referred to as a "headrest ANC".

In the ANC, reference microphones are required to be placed near the occupant's ears, which serve as control points. This is because the effective range of the ANC is within a radius of one-tenth of a wavelength of a sound from the control points. The following are examples of the relationship between a wavelength and a quiet zone.

±22 mm or less at 1500 Hz
±8.5 mm or less at 4000 Hz

The microphones installed on the headrest are not necessarily included in the above range. In that case, the quiet zone cannot be formed around the occupant's ears. Thus, in order to exhibit an effect of the headrest ANC, it is preferable to employ a virtual sensing technique that moves the quiet zone. Although the quiet zone can be moved by the virtual sensing, the virtual sensing requires the position of the occupant's ears to be highly accurately detected. Some methods for detecting the positions of the ears will be described below.

FIG. 1 is a diagram illustrating a method for detecting the position of an occupant's ears by a monocular camera. The occupant's face, eyes, nose, and ears are detected by subjecting image data to image processing. For example, a facial feature detecting apparatus mounted on a vehicle has statistical data on facial features. The method illustrated in FIG. 1 estimates the position of the occupant's ears by estimating the depth of the face based on a typical eye width, thus causing large error due to individual differences. In addition, it may be difficult for the monocular camera to capture an image of the occupant's ear depending on the face direction, thus failing to detect the occupant's ear.

FIG. 2A and FIG. 2B are diagrams illustrating typical error factors and occlusion regions in a depth sensor. FIG. 2A depicts ranges in which laser is emitted from a laser rangefinder (LRF) used as the depth sensor. A depth sensor 201 can measure the distance to an object 206. However, even if it is desired to determine the distance to the left side of the object 206, a laser beam does not directly strike the left side of the object 206, and is reflected at a point 204 on the front side of the object or at a point 202 on the background. In the case 2, a laser beam is reflected on the inclined surface of an object. However, if the angle between a laser beam and the scanned surface is an acute angle, a distance 1 (L) changes greatly even if the irradiation direction of the laser beam is shifted by one scan line. Therefore, a slight shift in the irradiation direction of a laser beam may result in large error. In addition, it is difficult to accurately detect the distances to the edges of the face due to diffuse reflection of spot light or lack of resolution. As human ears are located on the sides of the head, a slight shift in the irradiation direction of a laser beam may result in large error, similar to the above example.

FIG. 2B illustrates an example in which a camera and an LRF are used together. As illustrated in FIG. 2B, when a camera 209 and an LRF 201 are used together, the camera 209 and the LRF 201 cannot be physically located at the same position. Therefore, the camera 209 and the LRF 201 have different angles of view and occlusion regions as illustrated in FIG. 2B. If there is an object 210, a region 211 becomes an occlusion region of the camera 209, and a region 212 becomes an occlusion region of the depth sensor 201. Therefore, when information from multiple sensors and cameras is integrated, occlusion regions of all the sensors and the cameras need to be considered. Because data association cannot be performed for these occlusion regions, the distance to the object cannot be accurately measured. Thus, when a distance is measured, an interpolation method (for example, using neighboring points) is required, thereby causing error. For a human face, because the ears are located on the sides of the face, the ears tend to be occluded.

FIGS. 3A and 3B are diagrams illustrating examples in which misdetection occurs when a depth sensor is used. In the example of FIG. 3A, the depth sensor 201 mistakenly detects light incident on the cheek as spot light incident on the ear. As described above, due to diffuse reflection of spot light or lack of resolution, it is difficult to accurately detect the position of the ear located near the edge of the face, namely near the boundary between the face and the background. In the example of FIG. 3B, spot light emitted from the depth sensor 201 is incident on the background, instead of the face. As a result, the position of the ear is mistakenly detected. As described above, misdetection in which the measured point deviates from the expected point tends to occur near the edges of the face. Further, even if the measured point is slightly shifted sideways from the expected point, large error occurs.

In order to solve the above-described disadvantage, not only a technique that actually measure the positions of the ears, but also a technique that estimates the positions of the ears based on facial features has been proposed (see, Patent Document 1, for example). Patent Document 1 discloses an in-vehicle sound apparatus that estimates the positions of the ears based on the position of the eyes, if one of the ears is not detected.

However, in the related-art techniques, it is required to measure the positions of an occupant's ears beforehand, and the estimation method is based on inaccurate position information that uses statistical data.

RELATED-ART DOCUMENTS

Patent Documents

[Patent Document 1] Japanese Laid-Open Patent Publication No. 2015-231063
[Non-Patent Document 1] Masaharu Nishimura, "Active Noise Control", Corona Publishing Co., Ltd, Oct. 6, 2017

SUMMARY OF THE INVENTION

It is a general object of the present invention to provide a facial feature detecting apparatus that accurately estimates the position of a facial feature without pre-measurement by taking individual differences into account.

According to an embodiment of the present invention, a facial feature detecting apparatus includes a feature sensor configured to acquire information on facial features of a subject; a feature detecting unit configured to detect the facial features of the subject from the information acquired by the feature sensor; a three-dimensional coordinates calculating unit configured to calculate three-dimensional coordinates of the facial features of the subject; and a feature position estimating unit configured to estimate first three-dimensional coordinates of a first facial feature from second three-dimensional coordinates of a second facial feature of the detected facial features, on a basis that the first facial feature and the second facial feature are located at bilaterally symmetrical positions.

According to an embodiment of the present invention, a facial feature detecting apparatus includes a feature sensor configured to acquire information on facial features of a subject; a feature detecting unit configured to detect the facial features of the subject from the information acquired by the feature sensor; a three-dimensional coordinates calculating unit configured to calculate first three-dimensional coordinates of the facial features of the subject; a face direction estimating unit configured to estimate a face direction of the subject, based on the calculated first three-dimensional coordinates of the detected facial features; a 3D model information acquiring unit configured to acquire given three-dimensional coordinates of a given facial feature of the subject from a 3D model storage that accumulates second three-dimensional coordinates of the facial features of the subject in a frontal face direction; and a face direction rotating unit configured to cause the acquired given three-dimensional coordinates of the given facial feature of the subject to be rotated in the estimated face direction.

According to an embodiment of the present invention, a facial feature detecting method includes acquiring, by a feature sensor, information on facial features of a subject; detecting, by a feature detecting unit, the facial features of the subject from the information acquired by the feature sensor; calculating, by a three-dimensional coordinates calculating unit, first three-dimensional coordinates of the facial features of the subject; estimating, by a face direction estimating unit, a face direction of the subject, based on the calculated first three-dimensional coordinates of the detected facial features; acquiring, by a 3D model information acquiring unit, given three-dimensional coordinates of a given facial feature of the subject from a 3D model storage that accumulates second three-dimensional coordinates of the facial features of the subject in a frontal face direction; and causing, by a face direction rotating unit, the acquired given three-dimensional coordinates of the given facial feature of the subject to be rotated in the estimated face direction.

BRIEF DESCRIPTION OF THE DRAWINGS

Other objects and further features of the present invention will be apparent from the following detailed description when read in conjunction with the accompanying drawings, in which:

FIGS. 2A and 2B are diagrams illustrating typical error factors and occlusion regions in a depth sensor;

FIG. 5 is a side view of a vehicle with a facial feature detecting apparatus;

FIG. 6 is an example of a functional block diagram illustrating functions of the facial feature detecting apparatus by blocks;

DESCRIPTION OF THE EMBODIMENTS

According to an embodiment of the present invention, a facial feature detecting apparatus that accurately estimates the position of a facial feature is provided.

In the following, a facial feature detecting apparatus and a facial feature detecting method performed by the facial feature detecting apparatus according to an embodiment of the present invention will be described with reference to the accompanying drawings.

First Embodiment

Figure 4:
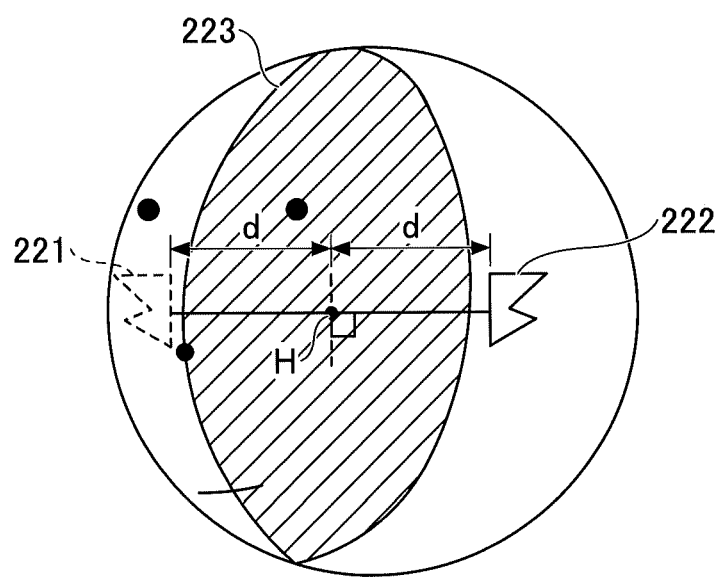
FIG. 4 is a diagram illustrating an overview of a method for identifying the position of an occupant's ear.

Overview of Method for Identifying Position of Ear According to First Embodiment FIG. 4 is a diagram illustrating an overview of a method for identifying the position of the ear according to a first embodiment. In the first embodiment, facial features of a subject are detected, and the direction in which the subject is facing is referred to as a face direction. The subject is assumed to be an occupant of a vehicle, and is thus hereinafter referred to as an "occupant". In FIG. 4, the occupant is facing to the right. Therefore, the facial feature detecting apparatus is unable to measure the position of the right ear 221. In such a case, the facial feature detecting apparatus estimates the position of the right ear 221 as follows.

(1) Features such as eyes, nose, and ears are constantly detected from facial images captured by the facial feature detecting apparatus. The facial feature detecting apparatus uses the features to estimate a median line 223 of the face. The median line 223 is a centerline that divides the face into right and left sides from the center, and is actually a plane with a depth direction. For example, the median line 223 is a plane that passes through the center of the eyes and through the nose, and whose normal vector passes through the eyes.

(2) Next, the facial feature detecting apparatus estimates the position of the right ear 221, based on the fact that the positions of the left and right ears are approximately bilaterally symmetrical. The position of the right ear 221 is obtained by extending d from H in the direction normal to the median line 223, where d is a distance from the left ear 222 to the median line 223, and H is a point of intersection drawn from the left ear 222 to the median line 223.

Accordingly, even if the position of an occupant's ear cannot be measured when the occupant is facing to the left or to the right, the facial feature detecting apparatus according to the present embodiment can estimate the position of the occupant's ear, based on the fact that the positions of the left and right ears are bilaterally symmetrical.

Terminology

Facial features are components of the face, such as the eyes, nose, mouth, eyebrows, ears, cheeks, chin, and forehead.

Three-dimensional coordinates of a feature is information indicating the position of the feature in a space represented by a set coordinate system.

A first facial feature and a second facial feature are symmetrical, and a feature directly detected by a sensor is the second facial feature.

Overall Configuration

Figure 1:
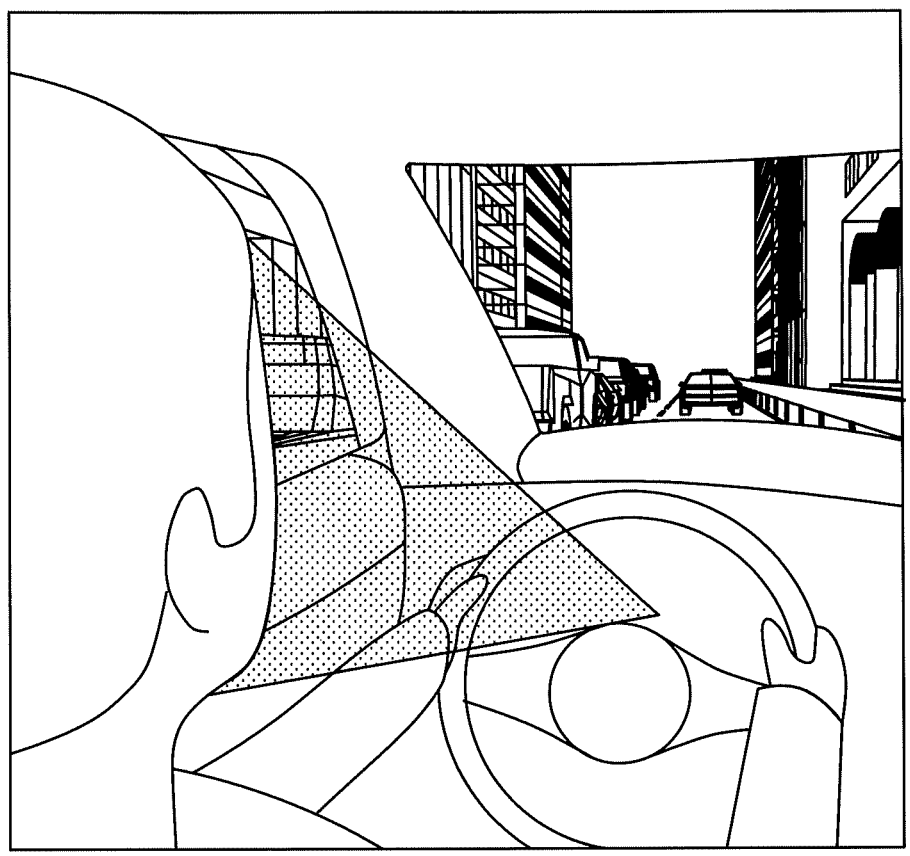
FIG. 1 is a diagram illustrating a method for detecting the position of an occupant's ears by a monocular camera.

FIG. 5 is a side view of a vehicle with a facial feature detecting apparatus. As illustrated in FIG. 5, a facial feature detecting apparatus 10 is mounted on a center cluster, a dashboard, or an instrument panel of a vehicle 8. However, the mounting position of the facial feature detecting apparatus 10 is not limited thereto. A feature sensor 11 that measures three-dimensional coordinates of features of the face, speakers 20a and 20b, and microphones 18 and 19 (speakers with microphones) are connected to the facial feature detecting apparatus 10. As illustrated in FIG. 1, the feature sensor 11 is provided at a position that allows an image of the occupant's face to be captured. For example, the feature sensor 11 is disposed on the instrument panel or a steering column such that the optical axis of the feature sensor 11 is directed toward the inside of the vehicle, or is disposed on a sun visor or an upper portion of a windshield such that the optical axis of the feature sensor 11 is directed toward the occupant's face.

As illustrated in FIG. 5, the speakers 20a and 20b and the microphones 18 and 19 are mounted on a headrest 9 to implement the headrest ANC. Estimation of the position of the occupant's ear not only improves ANC performance, but also improves the performance of, what is known as, spatial sound. Note that the headrest ANC can be used not only at a driver's seat but also at a front passenger's seat and a rear passenger's seat. In addition, the vehicle in which the headrest ANC is used is not limited to a passenger car, and the headrest ANC may be used in any vehicle equipped with a headrest 9. For example, the headrest ANC may be used in an electric wheelchair, a personal commuter (a microcar) with one or two seats, an airplane, a train, or a ship. Further, when the facial feature detecting apparatus 10 estimates the position of the ear, the occupant is not required to be in a vehicle. The facial feature detecting apparatus 10 may be used in a room. Further, the facial feature detecting apparatus 10 is not necessarily used for ANC or spatial sound.

The facial feature detecting apparatus 10 according to the present embodiment may simply be an apparatus that measures the position of the occupant's ear, or may have an audiovisual (AV) playback function. With the AV function, the facial feature detecting apparatus 10 can deliver optimized sound to the left and right ears of the occupant. In such a case, the facial feature detecting apparatus may be referred to as a tuner or car audio. Further, the apparatuses mounted on the vehicle 8 are collectively referred to as an in-vehicle apparatus.

Further, the facial feature detecting apparatus 10 may also be referred to as a navigation apparatus or a portable navigation device (PND). That is, the facial feature detecting apparatus 10 may search a route from a departure point to a destination point, set the route on a road map, display the route and the current location on an electronic map displayed on the display, output audio guidance before changing the direction based on the route, and guide the proper direction by animation. In addition, the facial feature detecting apparatus 10 may have a communication function to communicate with the Internet.

The facial feature detecting apparatus 10, which mainly has the AV function and the communication function, is referred to as Display Audio. The Display Audio provides a navigation function by communicating with a terminal device such as a smartphone. In such a case, an application installed on the smartphone creates a navigation screen, and the Display Audio communicates with the smartphone to acquire the navigation screen and displays the navigation screen on the display. CarPlay (registered trademark) and Android Auto (registered trademark) are known as such applications that operate on smartphones. The facial feature detecting apparatus 10 may be the Display Audio.

The facial feature detecting apparatus 10 may switch between an in-vehicle state in which the facial feature detecting apparatus 10 is mounted on a vehicle and a portable state in which the facial feature detecting apparatus 10 is carried. That is, the facial feature detecting apparatus 10 may be removable from the vehicle.

Further, the facial feature detecting apparatus 10 is mainly a dedicated terminal for the vehicle, but may be a general-purpose information processing terminal. Examples of the general-purpose information processing terminal include a smartphone, a tablet terminal, a mobile phone, a personal digital assistant (PDA), or a notebook personal computer (PC). These devices are normally used as information processing terminals. However, when application software for measuring the position of the occupant's ear is executed, such a general-purpose information processing terminal performs a process for estimating the position of the occupant's ear as described in FIG. 4, similar to the dedicated terminal.

Functions

FIG. 6 is an example of a functional block diagram illustrating functions of the facial feature detecting apparatus 10 by blocks. The facial feature detecting apparatus 10 includes a feature detecting unit 12, a three-dimensional coordinates calculating unit 13, a median line estimating unit 14, a feature position estimating unit 15, and an ANC control unit 16. The facial feature detecting apparatus 10 functions as an information processing apparatus including a CPU, a RAM, a ROM, a flash memory, an I/O device, a communication device, and a battery. The functions illustrated in FIG. 6 are functions or means implemented by causing the CPU to execute application software (or a program) loaded from the flash memory to the RAM and control various types of hardware.

The feature detecting unit 12 acquires face images of the occupant's face from the feature sensor 11, and detects features such as the eyes, nose, and ears from the face images. The feature sensor 11 may be a stereo camera, or may be a monocular camera (which may be a stereo camera) plus a depth sensor. In both cases, one or more facial images are captured. Thus, a classifier generated by machine learning such as pattern matching or deep learning is used to detect features. In the machine learning, models are created from images of eyes, nose, and ears, which are prepared beforehand, and face images are compared with the models. The feature detecting unit 12 transmits two-dimensional coordinates of the features to the three-dimensional coordinates calculating unit 13. Internal parameters and external parameters of a camera are calibrated. The three-dimensional coordinates calculating unit 13 uses these parameters and depth data acquired from the depth sensor to calculate coordinates of the features in three-dimensional space from the two-dimensional coordinates of the features. The coordinates are, for example, a coordinate system centered on the optical origin of the camera.

The three-dimensional coordinates calculating unit 13 calculates three-dimensional coordinates of the features. First, if the feature sensor 11 is a stereo camera, right and left cameras each capture a face image. Therefore, the feature detecting unit 12 compares left and right face images by a block matching algorithm, and detects parallax between the left and right face images on a per-pixel basis or on a per-pixel-block basis. The parallax is converted into a distance by $Z=BF/D$, where Z is a distance, B is a baseline length between cameras, F is a focal length, and d is parallax.

If the feature sensor 11 is a camera plus a depth sensor, the depth detected in the direction toward a feature is the distance to the feature. The depth sensor emits laser beams in the directions preliminarily associated with pixels of the camera. Therefore, when a pixel forming a feature is identified, the distance to the pixel can be identified. The three-dimensional coordinates calculating unit 13 transmits the three-dimensional coordinates of the features to the median line estimating unit 14.

The median line estimating unit 14 mainly uses three-dimensional coordinates of the eyes and nose to estimate a median line of the face. As described above, the median line is substantially a plane. Details will be described with reference to FIGS. 7A and 7B and FIG. 8. After the median line estimating unit 14 estimates the median line, the median line estimating unit 14 transmits the median line and three-dimensional coordinates of the occupant's ear, detected as a feature, to the feature position estimating unit 15.

Based on the median line and the three-dimensional coordinates of the detected ear, the feature position estimating unit 15 estimates three-dimensional coordinates of the other ear of the occupant. Details will be described with reference to FIGS. 7A and 7B and FIG. 8.

Three-dimensional coordinates of the ears obtained as described above are transmitted to the ANC control unit 16. The ANC control unit 16 uses the three-dimensional coordinates of the ears to enable the headrest ANC.

Estimation of Median Line and Three-Dimensional Coordinates of Ear

Figure 7A:
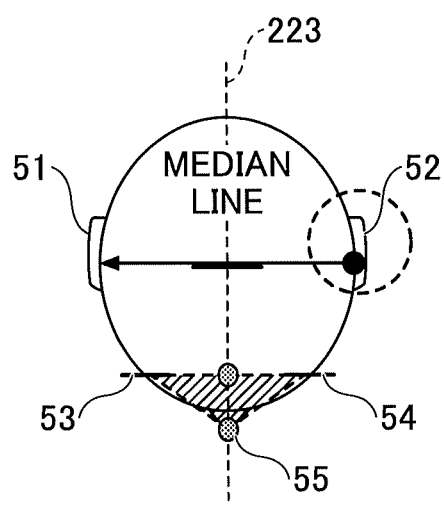
FIGS. 7A and 7B are diagrams illustrating an example of a median line.
Figure 7B:
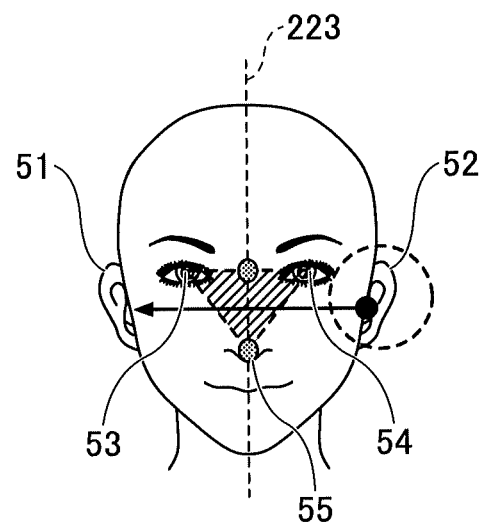
Figure 8:
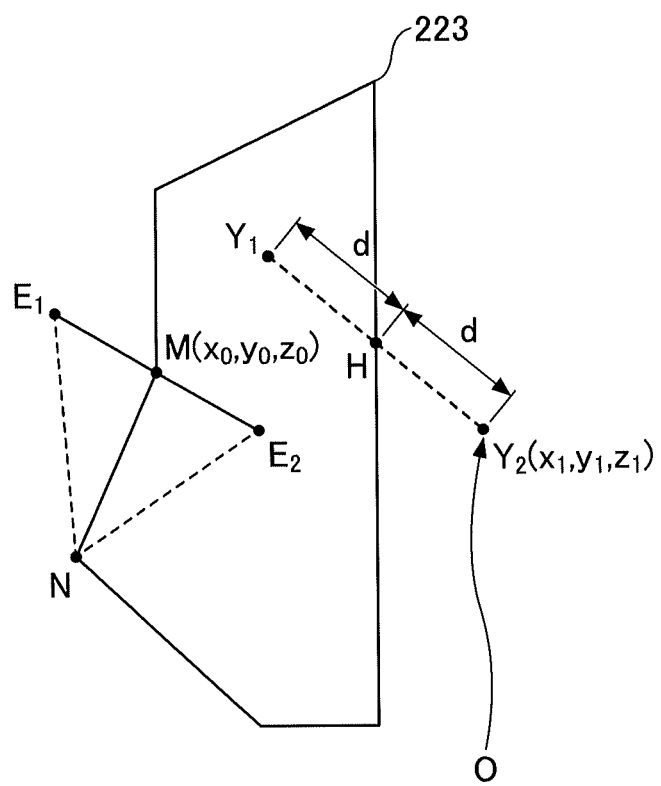
FIG. 8 is a diagram illustrating a method for estimating three-dimensional coordinates of an undetected ear based on three-dimensional coordinates of the eyes, nose, and ear detected from face images.

Referring to FIGS. 7A and 7B and FIG. 8, a method for estimating a median line will be described. FIGS. 7A and 7B are diagrams illustrating the median line 223. FIG. 8 is a diagram illustrating a method for estimating three-dimensional coordinates of an undetected ear based on three-dimensional coordinates of the eyes, nose, and ear detected from face images. FIG. 7A is a top view of the head, and FIG. 7B is a front view of the head. The median line 223 is a line (plane) that divides the head symmetrically into left and right sides. The right ear 51 and the left ear 52 are symmetrical with respect to the median line 223, the right eye 53 and the left eye 54 are bilaterally symmetrical with respect to the median line 223, and the nasal tip 55 is located on the median line 223.

Next, referring to FIG. 8, the method for obtaining the median line will be described. In FIG. 8, black circles represent the following features.
E1: right eye
E2: left eye
N: nasal tip
Y1: right ear
Y2: left ear The median line 223 of the face is a centerline that divides the face symmetrically into left and right sides from the center, and is thus a plane that passes through a midpoint M between the right eye E1 and the left eye E2 and through the nasal tip N. The equation of a plane is determined by a normal vector and coordinates of one point passing through the plane. In FIG. 8, a vector (ME1) connecting the middle point M to the right eye E1 is the normal vector. For sake of illustration, the vector is indicated in parentheses in the following description. The median line 223 passes through the midpoint M and the nasal tip N. Assuming that the coordinates of the midpoint M are $(x_0, y_0, z_0)$ and the components of the vector $(ME_1)$ are (a, b, and c), the median line estimating unit 14 obtains the median line 223 as follows.

$$a(x-x_0)+b(y-y_0)+c(z-z_0)=0 \quad ax+by+cz+d=0 \quad (1)$$

In the above equation, d is a constant

Next, in the face direction as illustrated in FIG. 8, the right ear Y1 is unable to be detected from the face images. However, because the left ear Y2 has been detected, the feature position estimating unit 15 estimates three-dimensional coordinates of the right ear Y1, based on the fact that the right ear Y1 and the left ear Y2 are bilaterally symmetrical with respect to the median line 223.

Coordinates of the left ear Y2 are assumed to be $(x_1, y_1, z_1)$. H is the foot of a perpendicular drawn from the left ear Y2 to the median line 223. Because the vector $(Y_2H)$ and the vector $(ME_1)$ are parallel, $(Y_2H)=k\,(ME_1)$.

Let the origin be O(0, 0, 0).

$$(OH) = (OY_2) + (Y_2H) = (x_1, y_1, z_1) + k(a, b, c).$$

The point H is on the median line.

$$a(x_1+ka)+b(y_1+kb)+c(z_1+kc)+d=0 \therefore k=-(ax_1+by_1+cz_1+d)/(a^2+b^2+c^2).$$

Therefore, $$(Y_2H) = (-(ax_1 + by_1 + cz_1 + d)/(a^2 + b^2 + c^2)a,$$
$$-(ax_1 + by_1 + cz_1 + d)/(a^2 + b^2 + c^2)b,$$
$$-(ax_1 + by_1 + cz_1 + d)/(a^2 + b^2 + c^2)c)$$
$$(OY_1) = (OY_2) + (Y_2Y_1)$$
$$= (OY_2) + 2(Y_2H)$$

Accordingly, coordinates of the right ear Y1 can be obtained.

Headrest ANC

Figure 9:
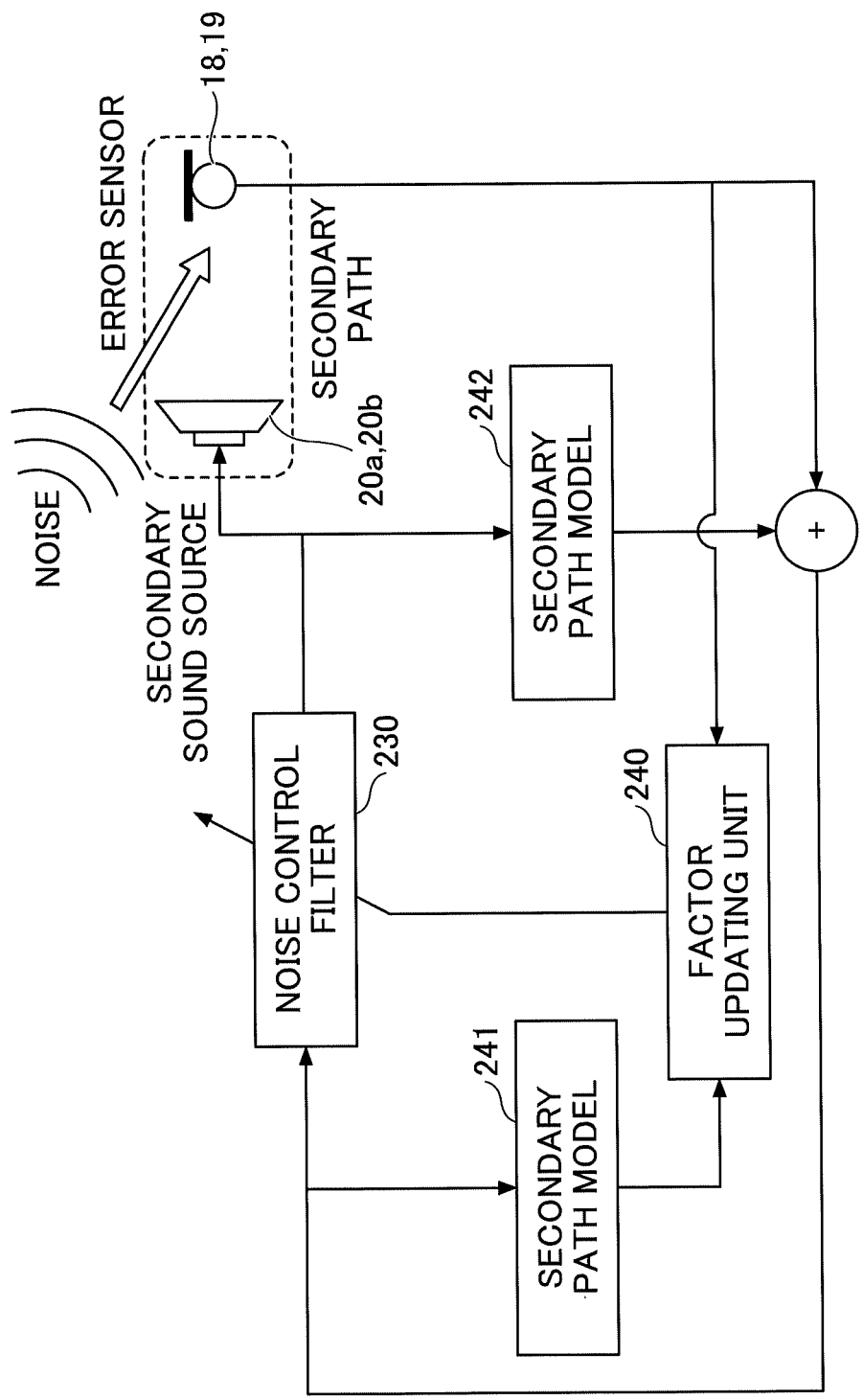
FIG. 9 is a diagram illustrating an example of a system configuration of a feedback control system.

FIG. 9 is a diagram illustrating an example of a system configuration of a feedback control system. In the following, the ANC will be briefly described as the ANC is a known technique. The feedback control system includes the microphones and 19 (referred to as error sensors) and the speakers 20a and 20b (referred to as secondary noise sources). The microphones 18 and 19 observe noise reduction effects in the vicinity of the left and right ears, and the speakers 20a and 20b generate pseudo noise to eliminate noise in the vicinity of the left and right ears. A factor updating unit 240 updates a noise control filter 230 so as to minimize an error signal that is the difference between noise detected by the microphones 18 and 19 disposed on the headrest 9 and pseudo noise generated by the speakers 20a and 20b disposed on the headrest 9. Models of secondary paths that are transmission paths from the secondary sound sources (speakers) to the error sensors (microphones) are required. The filtered-x algorithm is used to update coefficients of the noise control filter 230. The ANC may be feedforward control, or may be hybrid control in which both feedback control and feedforward control are used. In addition, when a plurality of microphones and speakers are installed as in the present embodiment, control that removes a crosstalk component may be added.

When the ANC is used in a three-dimensional sound field, a quiet zone can be created around the error sensors, but the size of the quiet zone is determined by the frequency of noise. Specifically, noise of approximately 10 dB is reduced in a spherical (or crescentic) range having a diameter of one-tenth of the wavelength. For example, if the frequency is 100 Hz, the diameter of the quiet zone is 34 cm. However, if the frequency is 1,000 Hz, the diameter of the quiet zone is as small as 3.4 cm. Therefore, in order to control noise over a wide range, it is important to accurately estimate the position of the occupant's ear.

In the present embodiment, the virtual sensing technique that moves the quiet zone based on the estimated position of the occupant's ear can be employed. The virtual sensing technique has two approaches: one requires prior learning and the other does not require prior learning. In the approach that does not require prior learning, a large number of microphones are generally used to estimate sound pressure at a location where a microphone cannot be physically installed (which is referred to as a virtual microphone location), and a quiet zone is created at the virtual microphone location. In the approach that requires prior learning, transfer functions between an error microphone location and a virtual microphone location, and also characteristics of a secondary path to each of the microphone locations are preliminarily identified. At the pre-learning stage, a microphone is actually installed at the virtual microphone location. For the ANC and the virtual sensing technique, see Non-Patent Document 1.

The calculation or estimation of the three-dimensional coordinates of both ears can also be suitably utilized for spatial sound. For spatial sound, in order to transmit sound to both ears without delay, the distance from musical speakers to the positions of the ears are estimated, respectively. Then, the timing of outputting sound from the speakers is adjusted so that the sound is not delayed by the distances from the speakers to the ears. In addition, the sound output is adjusted such that the sound is output to the ears at approximately the same volume in accordance with the distances from speakers to the ears. In addition, the phase of sound is controlled such that the phase of sound reaches its peak when arriving at the ears.

Operation Procedure

Figure 10:
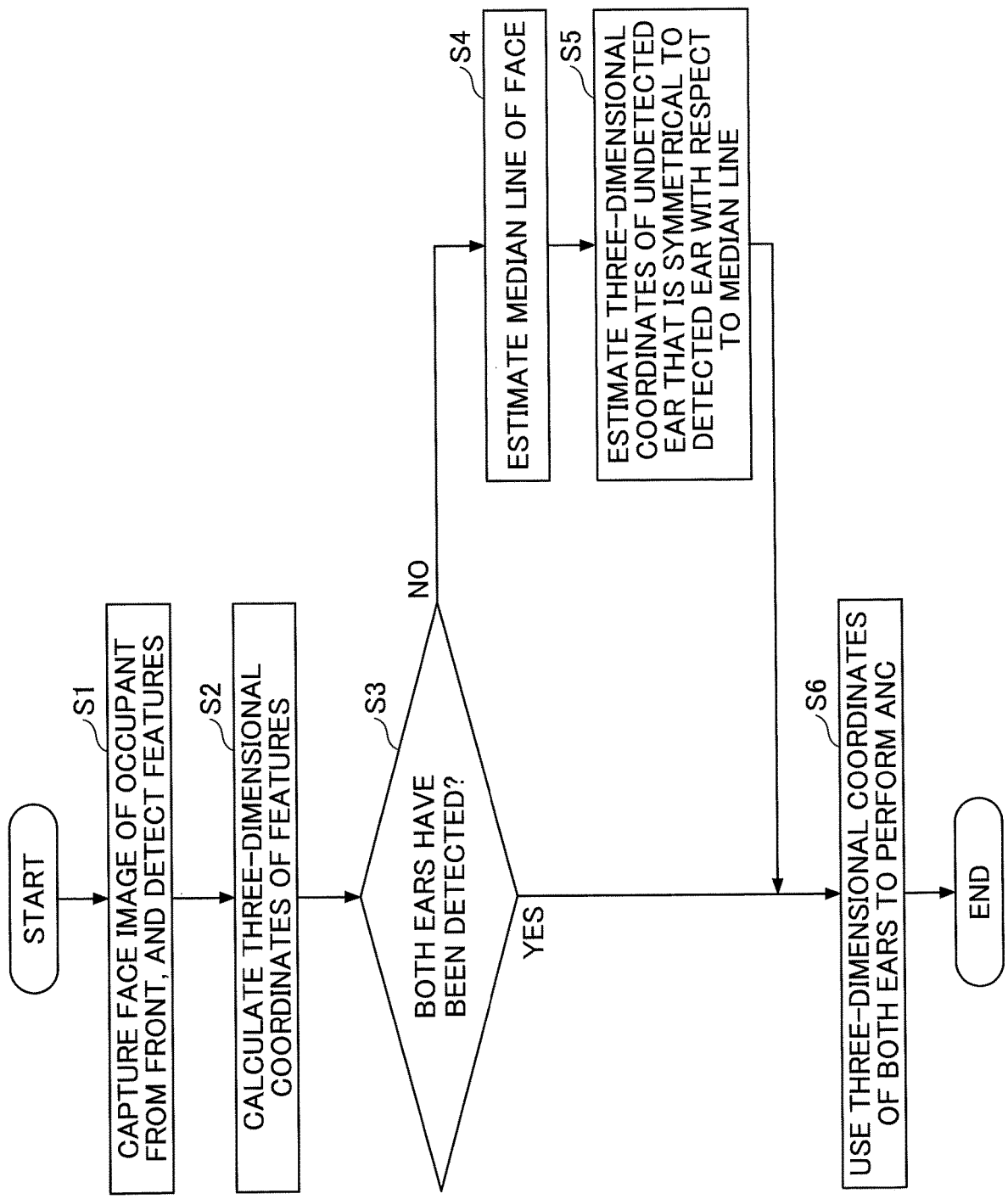
FIG. 10 is a flowchart illustrating an example of a process performed by the facial feature detecting apparatus to estimate three-dimensional coordinates of the occupant's ear based on three-dimensional coordinates of the other ear.

FIG. 10 is a flowchart illustrating an example of a process performed by the facial feature detecting apparatus 10 to estimate three-dimensional coordinates of the occupant's ear based on three-dimensional coordinates of the other ear. The process of FIG. 10 starts when the ANC is performed (for example, when a vehicle is moving), but the process may be performed as appropriate if the position of the occupant's ear is required to be estimated.

The feature sensor 11 repeatedly captures a face image of an occupant, and the feature detecting unit 12 detects features (S1).

The three-dimensional coordinates calculating unit 13 calculates three-dimensional coordinates of the features (S2). In addition to the occupant's eyes, nose, and ears, the occupant's eyebrows, nostrils, mouth, and outline may be detected.

The feature detecting unit 12 determines whether both of the occupant's ears have been detected (S3). The feature detecting unit 12 may simply determine whether two ears have been detected. That is, the feature detecting unit 12 determines whether three-dimensional coordinates of the right ear of the occupant facing to the right is not detected or three-dimensional coordinates of the left ear of the occupant facing to the left is not detected. If the occupant is facing the front, both of the occupant's ears may fail to be accurately detected. In such as case, a second embodiment may be applied to estimate the direction of the occupant's face, which will be described below. Alternatively, if the occupant is facing the front, the positions of the occupant's ears are not required to be estimated. When it is determined that both of the occupant's ears have been detected (yes in step S3), the process proceeds to step S6.

When it is determined that both of the occupant's ears have not been detected (no in step S3), the median line estimating unit 14 estimates the median line 223 of the face (S4). Then, based on calculated three-dimensional coordinates of the occupant's detected ear, the feature position estimating unit 15 estimates three-dimensional coordinates of the occupant's other ear that is symmetrical to the detected ear with respect to the median line 223. (S5).

Next, the ANC control unit 16 uses the three-dimensional coordinates of both of the occupant's ears to perform the ANC (S6).

Summary

As described above, even if one of an occupant's ears is unable to be detected due to the direction of the occupant's face, the facial feature detecting apparatus 10 according to the present embodiment estimates the position of the undetected ear by utilizing the median line 223, thus allowing an effect of the ANC control to further improve.

Second Embodiment

Figure 3B:
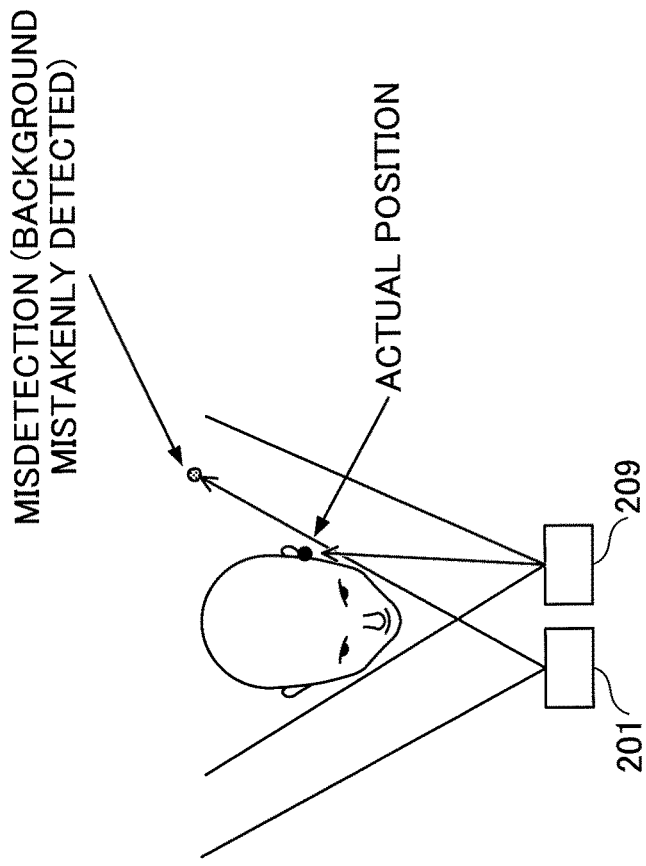
FIGS. 3A and 3B are diagrams illustrating examples in which misdetection occurs when a depth sensor is used.
Figure 3A:
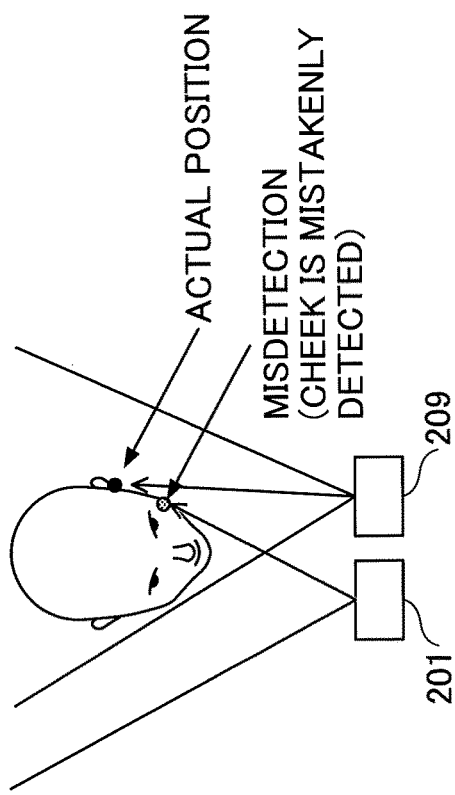

According to the first embodiment, even if one of the occupant's ears is unable to be detected due to the direction of the occupant' face, the position of the undetected ear can be estimated. However, if the occupant is facing the front, misdetection described with reference to FIGS. 3A and 3B tends to occur. Further, the position of a face part may be shifted from the target position by a few millimeters to a few centimeters depending on the person. Thus, it may be difficult to accurately estimate the position of the ear in some cases. The facial feature detecting apparatus 10 according to the second embodiment uses the face direction to create 3D models of features, and estimates from a 3D model, the position of the occupant's ear that is unable to be detected due to the face direction.

Functions

In the second embedment, there are two phases: an accumulation phase in which 3D models are accumulated, and an estimation phase in which a 3D model is used to estimate the position of the occupant's ear in order to perform the ANC.

Figure 11:
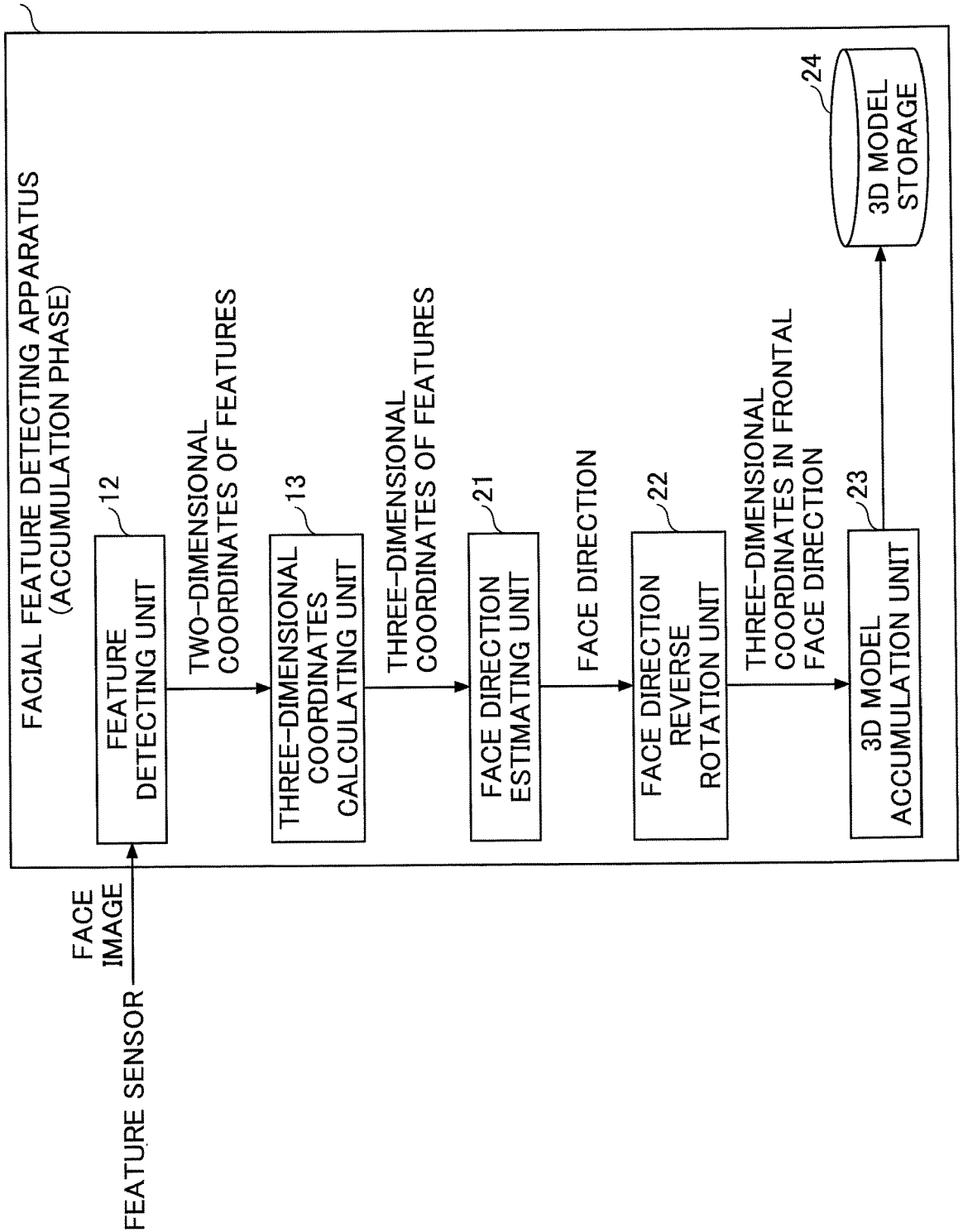
FIG. 11 is a functional block diagram illustrating an example of functions of the facial feature detecting apparatus in an accumulation phase.

FIG. 11 is a functional block diagram illustrating an example of functions of the facial feature detecting apparatus 10 in the accumulation phase. The facial feature detecting apparatus 10 illustrated in FIG. 11 includes the feature detecting unit 12, the three-dimensional coordinates calculating unit 13, a face direction estimating unit 21, a face direction reverse rotation unit 22, and a 3D model accumulation unit 23. The functions of the feature detecting unit 12 and the three-dimensional coordinates calculating unit 13 according to the second embedment may be the same as those of the first embodiment.

The face direction estimating unit 21 estimates the direction (a roll angle, a yaw angle, and a pitch angle) of the occupant's face, based on three-dimensional coordinates of both eyes and nasal tip of the occupant. Details will be described with reference to FIGS. 12A through 12D and FIG. 13. The face direction estimating unit 21 transmits the face direction (the roll angle, the yaw angle, and the pitch angle) to the face direction reverse rotation unit 22.

The face direction reverse rotation unit 22 causes three-dimensional coordinates of a feature to be rotated in a reverse direction from the face direction estimated by the face direction estimating unit 21. For example, if the face direction is defined by the roll angle=$\alpha$, the yaw angle=$\beta$, and the pitch angle=$\gamma$, the face direction reverse rotation unit 22 causes three-dimensional coordinates of a feature of the occupant to be rotated by the roll angle of $-\alpha$, the yaw angle of $-\beta$, and the pitch angle of $-\gamma$. Accordingly, the three-dimensional coordinates of the feature coincide with coordinates of the feature when the occupant is facing the front. The face direction reverse rotation unit 22 transmits the three-dimensional coordinates of the feature in the frontal face direction to the 3D model accumulation unit 23.

The 3D model accumulation unit 23 accumulates three-dimensional coordinates of features in the frontal face direction, in a 3D model storage 24. Specifically, the 3D model accumulation unit 23 associates three-dimensional coordinates with labels such as an eye, a nose, and an ear, and accumulates the three-dimensional coordinates in the 3D model storage 24. Each time a face image is captured, three-dimensional coordinates of features of the occupant facing the front are stored. Thus, three-dimensional coordinates of features in the frontal face direction are accumulated over time. As will be described below, if three-dimensional coordinates of a feature in the frontal face direction have large error, the three-dimensional coordinates are deleted. Thus, highly-accurate three-dimensional coordinates of features in the frontal face direction are gradually accumulated.

Direction of Face

Figure 12A:
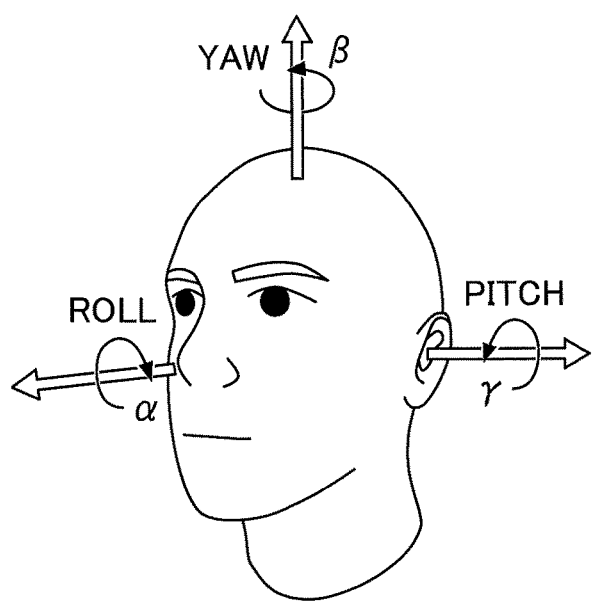
FIGS. 12A through 12D are diagrams illustrating an example of the face direction (a roll angle, a yaw angle, and a pitch angle)
Figure 12B:
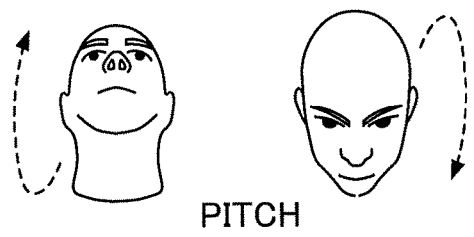
Figure 12C:
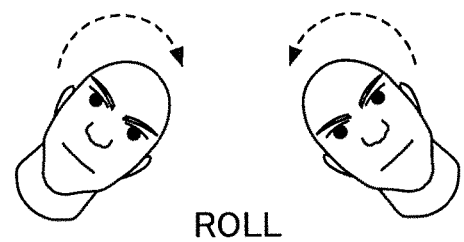
Figure 12D:
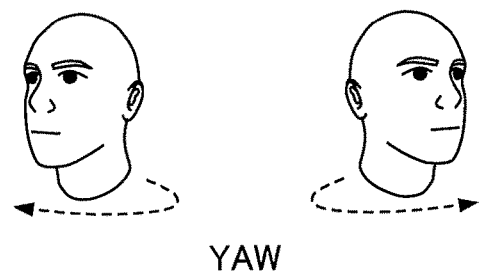

Referring to FIGS. 12A through 12D and FIG. 13, the face direction will be described. FIGS. 12A through 12D are diagrams illustrating an example of the face direction (a roll angle, a yaw angle, and a pitch angle). The occupant's face can be rotated about each of three axes illustrated in FIG. 12A. As illustrated in FIG. 12B, the angle when the face is rotated up and down is referred to as a pitch angle. As illustrated in FIG. 12C, the angle when the face is rotated obliquely is referred to as a roll angle. As illustrated in FIG. 12D, the angle when the face is rotated laterally is referred to as a yaw angle.

Figure 13:
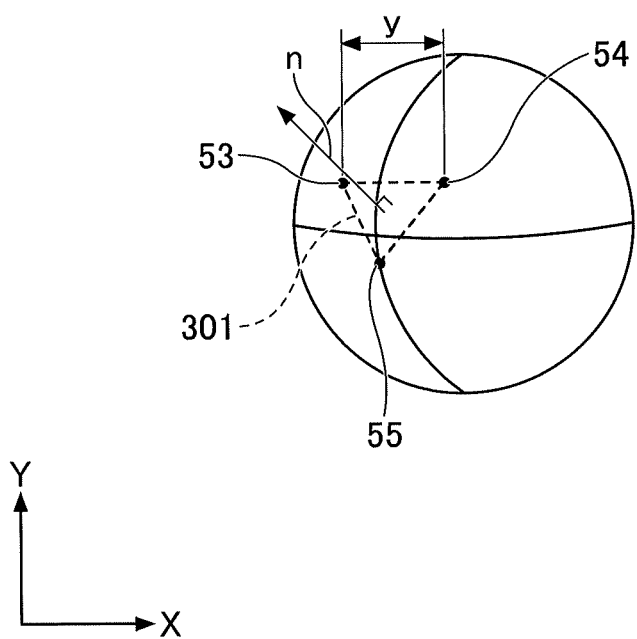
FIG. 13 is a diagram illustrating an example of a method for estimating the face direction.

FIG. 13 is a diagram illustrating an example of a method for estimating the face direction. In FIG. 13, a circle represents a face in which a triangle 301 connecting the right eye 53, the left eye 54, and the nasal tip 55 is formed. In the proposed system, the face direction can be accurately estimated by using three-dimensional data. For the yaw angle and the pitch angle, an angle formed by the normal vector n of the triangle 301 and the X-axis, and an angle formed by the normal vector n of the triangle 301 and the Y-axis are calculated as the yaw angle and the pitch angle, respectively. For the roll angle, in a state in which three-dimensional coordinates of each face part are reversely rotated around the centroid of the triangle 301 by the yaw angle and then the pitch angle, but are not reversely rotated by the roll angle, an angle formed by the vector, extending from the center of the left eye ball to the center of the right eye ball, and the X axis is calculated as the roll angle. Note that, if the direction of a person's face is defined as "an angle with respect to a vertical plane passing through the center between both eyeballs when the person is facing horizontally level," a plane formed by the triangle 301 has a certain angle in the pitch direction with respect to a reference plane, even when the person is looking at the front of a camera. In addition, an angle of the face of the occupant facing the front differs depending on the installation angle of the camera. Thus, statistical data or the installation angle of the camera may be used to correct the angle.

Accumulation of 3D Models

Figure 14:
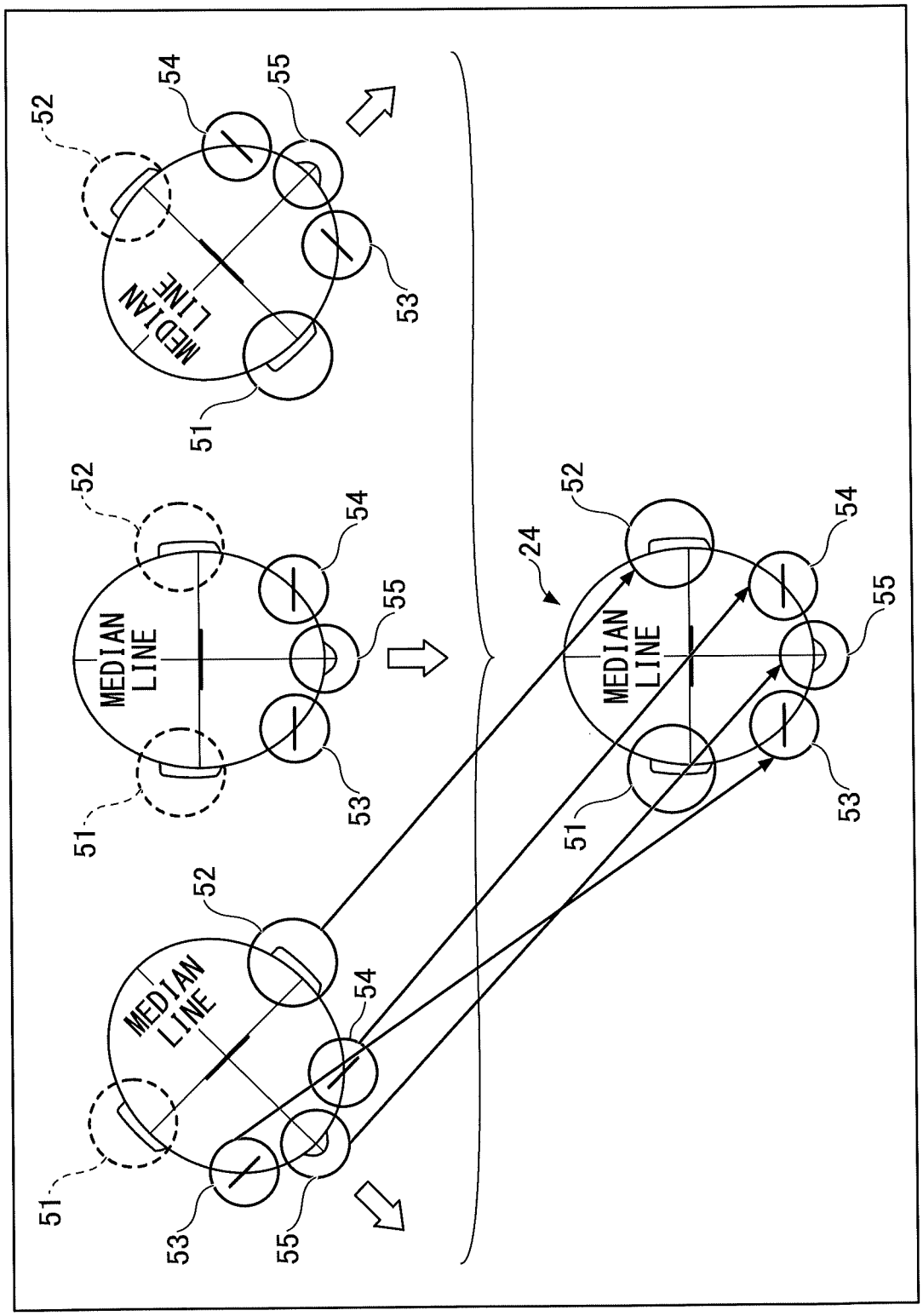
FIG. 14 is a schematic diagram illustrating a 3D model generated by reversely rotating the face toward the front.

Referring to FIG. 14, accumulation of 3D models will be described. FIG. 14 is a schematic diagram illustrating a 3D model generated by reversely rotating the face toward the front. The upper left part of FIG. 14 illustrates the occupant's face facing to the right. In this case, three-dimensional coordinates of the right ear 51 are not stored. The face direction reverse rotation unit 22 reversely rotates the occupant's face toward the front. Namely, the face direction reverse rotation unit 22 reversely rotates three-dimensional coordinates of the right eye 53, the left eye 54, the nasal tip 55, and the left ear 52 by the estimated yaw angle. By reversely rotating the three-dimensional coordinates, the occupant's face faces the front. Therefore, the 3D model accumulation unit 23 stores the three-dimensional coordinates of the right eye 53, the left eye 54, the nasal tip 55, and the left ear 52 in the 3D model storage 24, as illustrated in the lower part of FIG. 14. That is, the lower part of FIG. 14 corresponds to the 3D model storage 24.

The upper middle part of FIG. 14 illustrates the occupant's face facing the front. In this case, three-dimensional coordinates of the right ear 51 and the left ear 52 are not stored. Further, there is no need to reversely rotate the occupant's face. The 3D model accumulation unit 23 stores three-dimensional coordinates of the right eye 53, the left eye 54, and the nasal tip 55. Note that connection lines between the upper middle part and the lower part of FIG. 14 are omitted for the sake of illustration.

The upper right part of FIG. 14 illustrates the occupant's face facing to the left. In this case, three-dimensional coordinates of the left ear 52 are not stored. The face direction reverse rotation unit 22 reversely rotates the occupant's face toward the front. Namely, the face direction reverse rotation unit 22 reversely rotates three-dimensional coordinates of the right eye 53, the left eye 54, the nasal tip 55, and the right ear by the estimated yaw angle. By reversely rotating the three-dimensional coordinates, the occupant's face faces the front. Therefore, the 3D model accumulation unit 23 stores the three-dimensional coordinates of the right eye 53, the left eye 54, the nasal tip 55, and the right ear 51 in the 3D model storage 24. Note that connection lines between the upper right part and the lower part of FIG. 14 are omitted for the sake of illustration.

Three-dimensional coordinates are measured in a fixed coordinate system such as a coordinate system of the feature sensor 11. However, not only does the direction of the occupant's face change, but also the occupant's face is translated vertically and horizontally. If three-dimensional coordinates of features were to be reversely rotated and stored, with the occupant's face remaining to be translated, the three-dimensional coordinates would vary. For this reason, it is preferable to cancel vertical and horizontal translation before performing reverse rotation. For example, in order to normalize a 3D model, the 3D model is translated such that the centroid of the triangle 301 becomes the origin, and is then reversely rotated. In the above example, the origin is set to the centroid of the triangle 301; however, the origin of the 3D model may be set to any other position such as the center of the ears or the nasal tip.

Operation In Accumulation Phase

Figure 15:
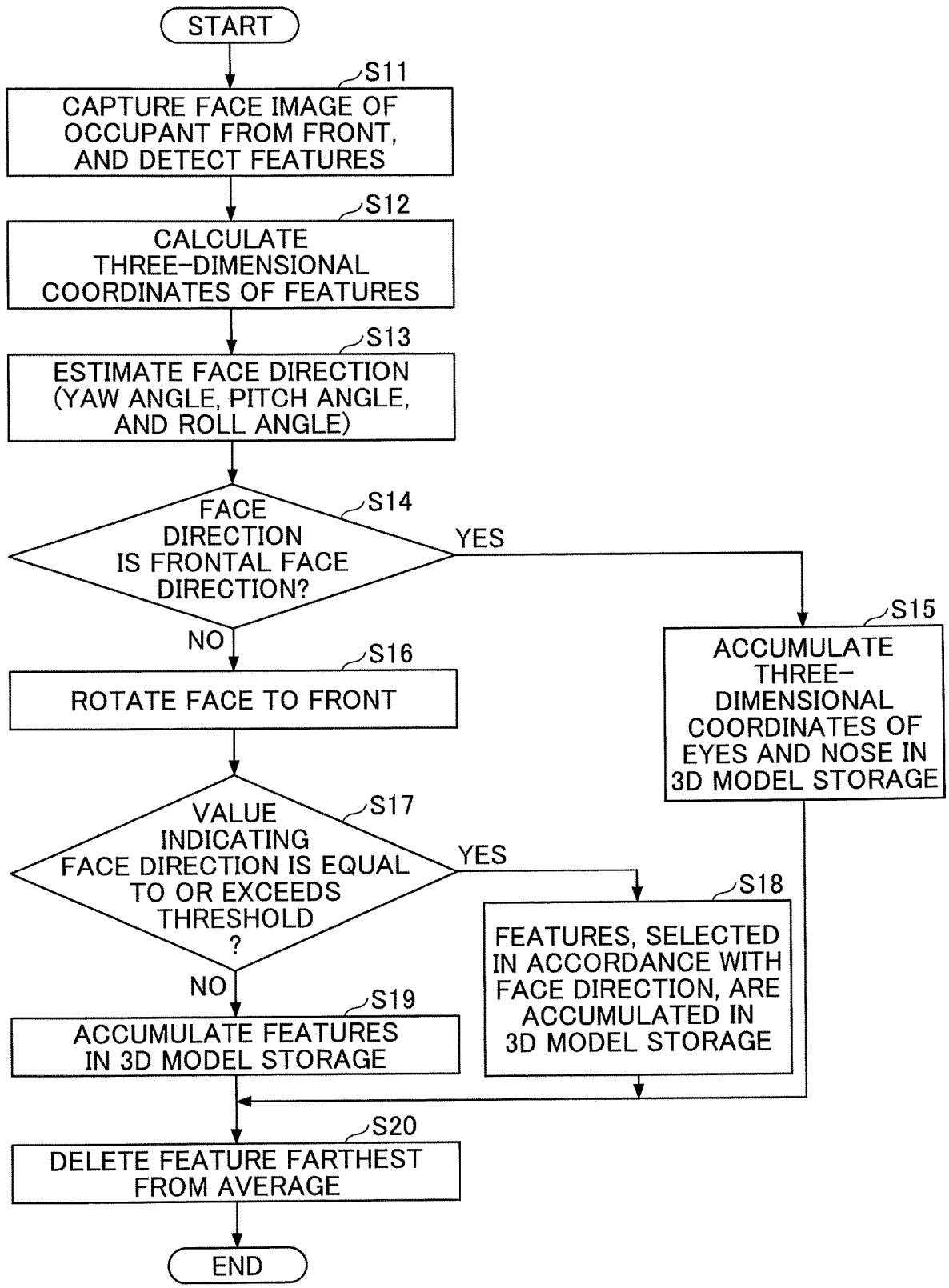
FIG. 15 is a flowchart illustrating an example of a process performed by the facial feature detecting apparatus to accumulate 3D models of facial features in the accumulation phase.

FIG. 15 is a flowchart illustrating an example of a process performed by the facial feature detecting apparatus 10 to accumulate 3D models of facial features in the accumulation phase. The process illustrated in FIG. 15 is repeatedly performed while the vehicle is moving.

First, the feature sensor 11 repeatedly captures a face image of an occupant, and the feature detecting unit 12 detects features (S11).

The three-dimensional coordinates calculating unit 13 calculates three-dimensional coordinates of the features (S12). In addition to the occupant's eyes, nose, and ears, the occupant's eyebrows, nostrils, mouth, and outline may be detected.

Next, the face direction estimating unit estimates the face direction (a yaw angle, a pitch angle, and a roll angle) (S13).

Then, the face direction estimating unit 21 determines whether the face direction is the frontal face direction (S14). If the face direction is the frontal face direction, the positions of the left and right ears may have error. In this case, the process proceeds to step S15.

The 3D model accumulation unit 23 accumulates three-dimensional coordinates of the eyes and nose in the frontal face direction, in the 3D model storage 24 (S15). That is, three-dimensional coordinates of the ears are not accumulated.

If the face direction is not the frontal face direction (no in S14), it is highly likely that the right ear or the left ear has been accurately detected. Thus, the face direction reverse rotation unit 22 reversely rotates the occupant's face to the front (S16). It may be determined whether either the right ear or the left ear has been actually detected.

Further, the face direction estimating unit 21 determines whether a value indicating the face direction is equal to or exceeds a threshold (S17). If the face direction is not the frontal face direction, and the value indicating the face direction is extremely large (yes in S17), features, selected in accordance with the face direction, are accumulated in the 3D model storage 24 (S18). For example, even if three-dimensional coordinates of features are calculated, the features are not accumulated if the yaw angle, the pitch angle, and the roll angle are extremely large. The yaw angle, the pitch angle, and the roll angle may have the same threshold, or may have different thresholds. For example, the features are selected and accumulated in accordance with the face direction as follows.

If the yaw angle is equal to or exceeds the threshold, three-dimensional coordinates of only the occupant's detected ear are accumulated, and three-dimensional coordinates of the eyes and nose are not accumulated.

If the roll angle is equal to or exceeds the threshold, the eyes and nose features can be accurately detected, and thus, filtering is not performed. Further, because the face direction is not the frontal face direction, three-dimensional coordinates of the occupant's detected ear are accumulated.

If the pitch angle is equal to or exceeds the threshold, three-dimensional coordinates of the eyes may have error due to the nose and hair. Therefore, only three-dimensional coordinates of the nose are accumulated, and the three-dimensional coordinates of the eyes are not accumulated. Further, because the face direction is not the frontal face direction, three-dimensional coordinates of the occupant's detected ear are accumulated.

As described in steps S15 and S18, the "filtering" means that three-dimensional coordinates are determined not to be accumulated in accordance with the face direction.

If the face direction is not the frontal face direction, and the value indicating the face direction is less than the threshold (no in S17), the 3D model accumulation unit 23 accumulates, in the 3D model storage 24, three-dimensional coordinates of features of the occupant's face reversely rotated by the face direction reverse rotation unit 22 (S19). Namely, if the occupant is facing to the right, three-dimensional coordinates of the left ear are accumulated, and if the occupant is facing to the left, three-dimensional coordinates of the right ear are accumulated, in addition to three-dimensional coordinates of the eyes and nose.

As described in steps S15 and S18, it is possible to prevent three-dimensional coordinates having large error from being applied to 3D models, by only accumulating three-dimensional coordinates of accurately detected features in accordance with the face direction.

Further, the 3D model accumulation unit 23 deletes the feature farthest from the average for each feature type (S20). The above-described process is repeatedly performed over time. For example, the process is performed at regular intervals, each time a given number of features is accumulated, or each time new three-dimensional coordinates are accumulated. By deleting features having large error, the accuracy of 3D models can be improved over time.

Estimation Phase In Which Position of Ear is Estimated

Figure 16:
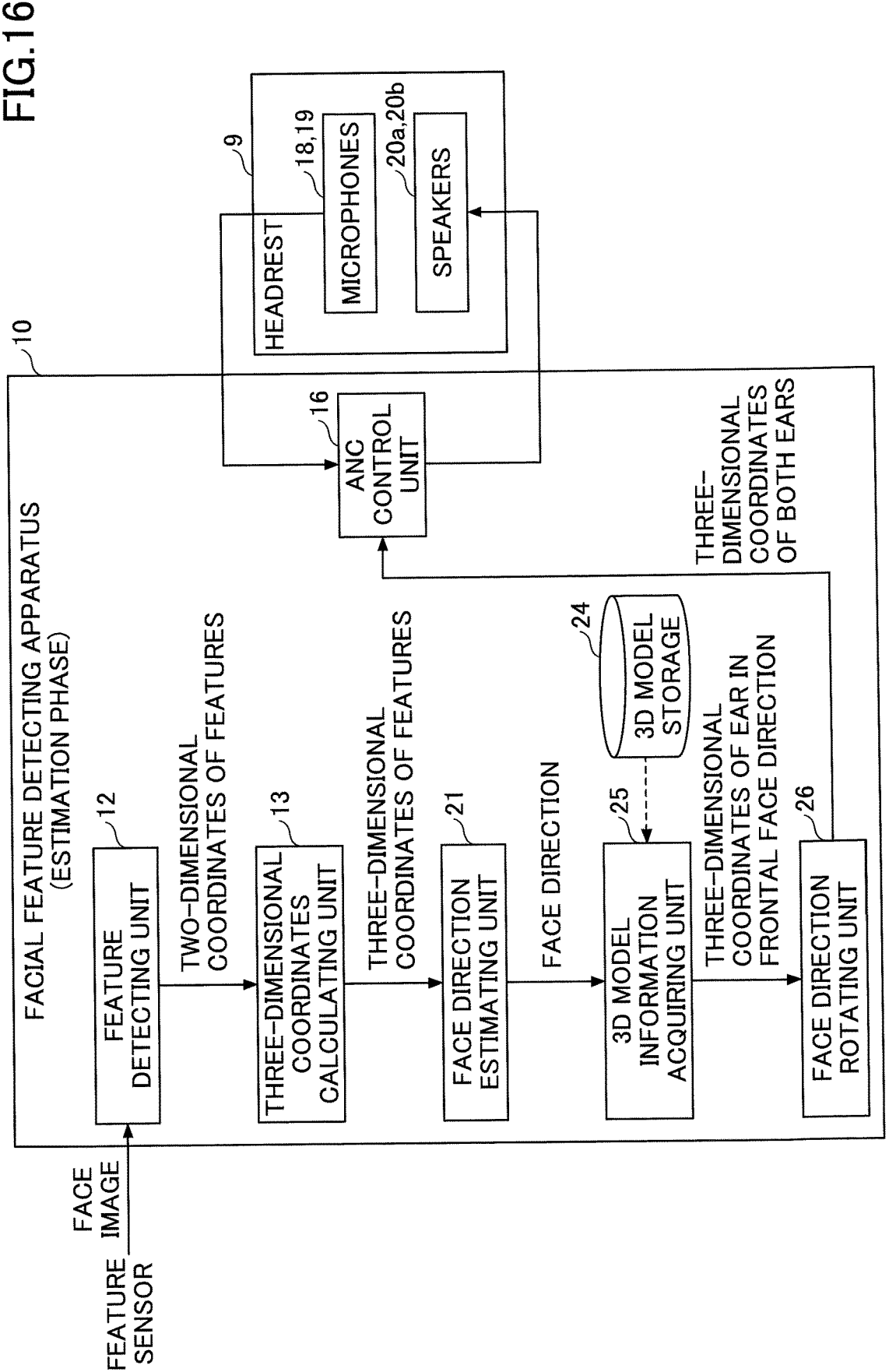
FIG. 16 is a functional block diagram illustrating an example of functions of the facial feature detecting apparatus in an estimation phase in which the position of the occupant's ear is estimated.

Next, the estimation phase in which the position of an occupant's ear is estimated from a 3D model will be described. FIG. 16 is a functional block diagram illustrating the facial feature detecting apparatus 10 in the estimation phase in which the position of the occupant's ear is estimated. The facial feature detecting apparatus 10 of FIG. 16 includes the feature detecting unit 12, the three-dimensional coordinates calculating unit 13, the face direction estimating unit 21, a 3D model information acquiring unit 25, a face direction rotating unit 26, and the ANC control unit 16. The functions of the feature detecting unit 12, the three-dimensional coordinates calculating unit 13, the face direction estimating unit 21, and the ANC control unit 16 may be same as those of FIG. 6 or FIG. 11.

The 3D model information acquiring unit 25 acquires three-dimensional coordinates of the ear of the occupant facing the front, from the 3D model storage 24. The face direction rotating unit 26 causes the three-dimensional coordinates of the ear of the occupant facing the front to be rotated in accordance with the face direction estimated by the face direction estimating unit 21. Accordingly, even if the occupant's ear is unable to be detected, three-dimensional coordinates of the ear of the occupant facing the estimated direction can be obtained.

Figure 17:
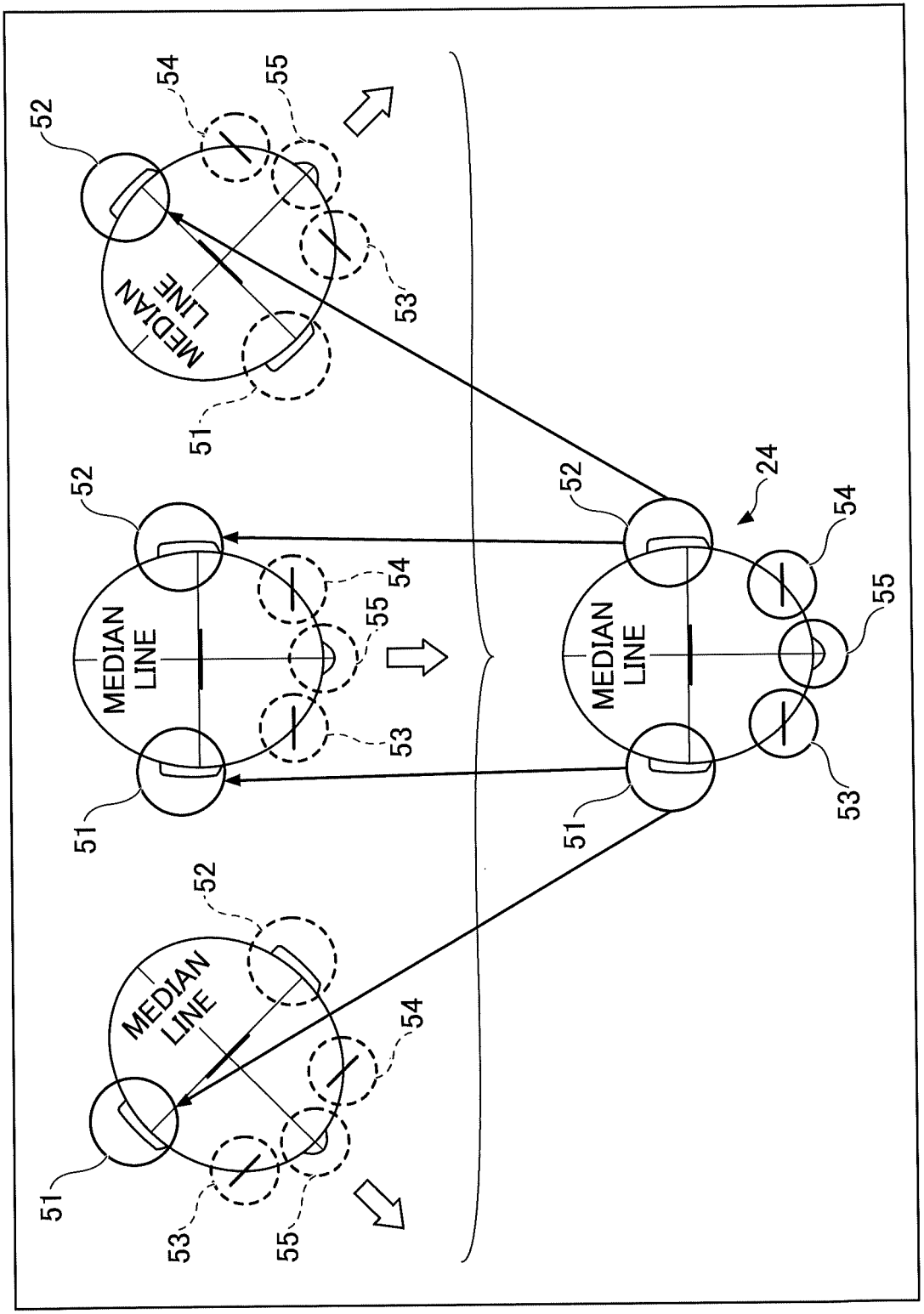
FIG. 17 is a diagram illustrating an example in which three-dimensional coordinates of the ear of the occupant facing the front are acquired from 3D model storage.

Example of Acquiring Three-Dimensional Coordinates of Ear of Occupant Facing Front From 3D Model Storage FIG. 17 is a diagram illustrating an example in which three-dimensional coordinates of the ear of the occupant facing the front are acquired from the 3D model storage 24. First, the lower part of FIG. 17 corresponds to the 3D model storage 24.

The upper left part of FIG. 17 illustrates the occupant's face facing to the right. In this case, three-dimensional coordinates of the right ear are not calculated. The 3D model information acquiring unit 25 acquires three-dimensional coordinates of the right ear 51 from the 3D model storage 24. Further, the face direction rotating unit 26 causes the three-dimensional coordinates of the right ear 51 to rotate to the right. Accordingly, it is possible to replace an invisible feature or a feature with low detection accuracy in the estimated direction by using a feature of a stored 3D model.

The upper middle part of FIG. 17 illustrates the occupant's face facing the front. In this case, three-dimensional coordinates of the right ear 51 and the left ear 52 are not used. The 3D model information acquiring unit 25 acquires three-dimensional coordinates of the right ear 51 and the left ear 52 from the 3D model storage 24. Because the face direction is the frontal face direction, the face direction rotating unit 26 does not need to rotate the three-dimensional coordinates.

The upper right part of FIG. 17 illustrates the occupant's face facing to the left. In this case, three-dimensional coordinates of the left ear 52 are not calculated. The 3D model information acquiring unit 25 acquires three-dimensional coordinates of the left ear 52. Further, the face direction rotating unit 26 causes the three-dimensional coordinates of the left ear 52 to be rotated to the left.

Accordingly, it is possible to replace an invisible feature or a feature with low detection accuracy by using a 3D model.

Note that, without the accumulation phase, it is possible to estimate the position of a feature based on a 3D model optimized for each person, by storing 3D models associated with personal identification information and using the 3D models together with personal authentication.

Figure 18:
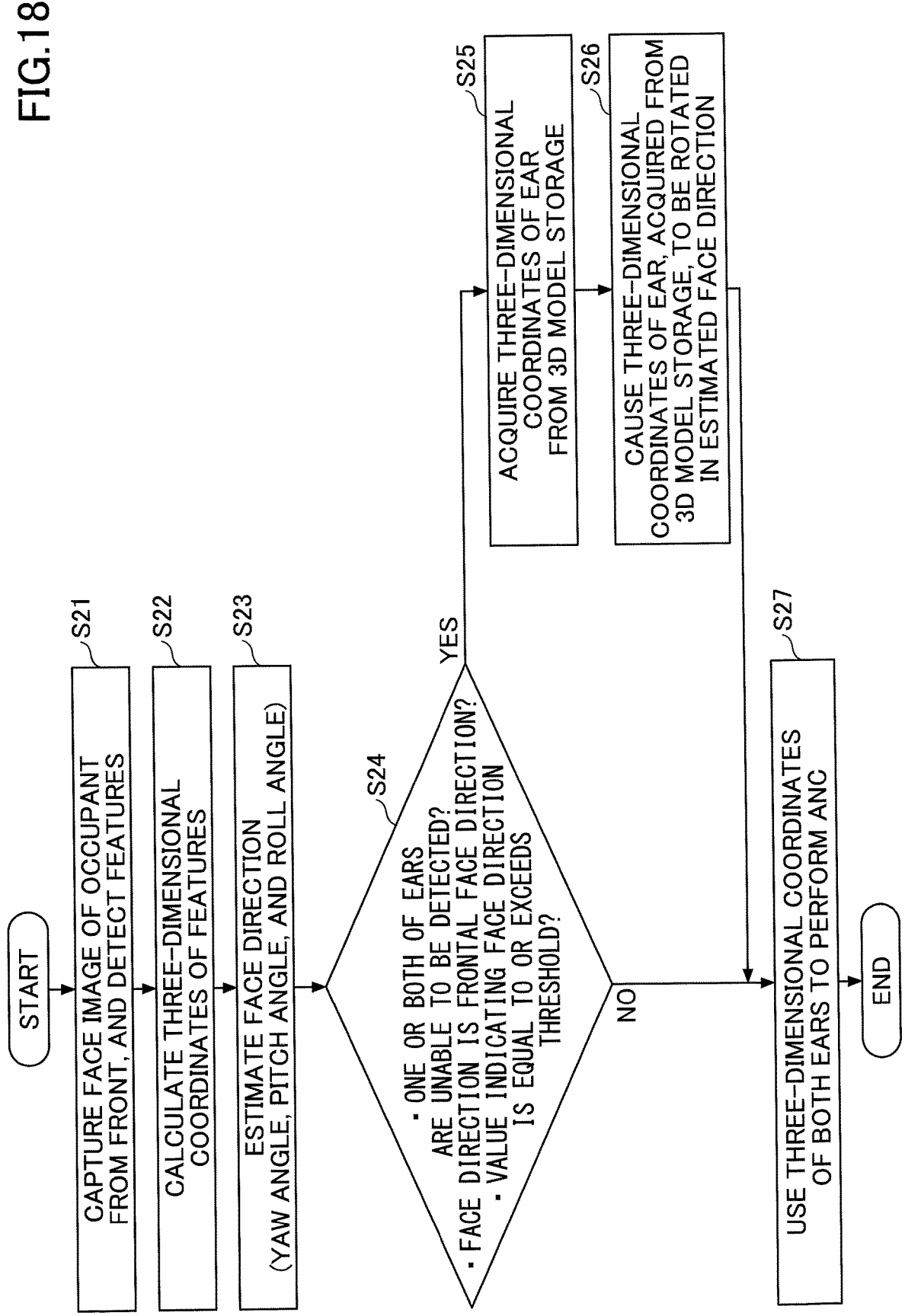
FIG. 18 is a flowchart illustrating an example of a process performed by the facial feature detecting apparatus to estimate the position of the occupant's ear from a 3D model in the estimation phase.

Operation in Estimation Phase In Which Position of Ear is Estimated From 3D Model FIG. 18 is a flowchart illustrating an example of a process performed by the facial feature detecting apparatus 10 to estimate the position of the occupant's ear from a 3D model in the estimation phase. The process illustrated in FIG. 18 starts when the ANC is performed (for example, when a vehicle is moving), but the process may be performed as appropriate if the position of the occupant's ear is required to be estimated. Steps S21 through S23 may be the same as steps S11 through S13.

Next, the feature detecting unit 12 determines whether one or both of the occupant's ears are unable to be detected. Alternatively, the face direction estimating unit 21 determines whether the face direction is the frontal face direction or a value indicating the face direction is equal to or exceeds the threshold (S24). Namely, it is determined whether a feature is unable to be detected or whether detection accuracy is low. If the determination in step S24 is no, the process proceeds to step S27.

If the determination in step S24 is yes, the 3D model information acquiring unit 25 acquires three-dimensional coordinates of the occupant's ear unable to be detected or with low detection accuracy, from the 3D model storage 24 (S25). In accordance with the face direction subjected to filtering, the 3D model information acquiring unit 25 may acquire three-dimensional coordinates of features, other than the ear, with low detection accuracy.

Next, the face direction rotating unit 26 causes the three-dimensional coordinates of the occupant's ear, acquired from the 3D model storage 24, to be rotated in the estimated face direction (S26). Further, the face direction rotating unit 26 translates the three-dimensional coordinates of the occupant's ear, in accordance with translation of the face.

Then, the ANC control unit 16 uses the three-dimensional coordinates of both of the occupant's ears to perform the ANC (S27).

According to the present embodiment, even if the positions of the occupant's ears are asymmetric, the position of one of the ears can be accurately estimated. Further, it is possible to prevent the cheek or the background from being mistakenly detected. Further, instead of accumulating three-dimensional coordinates of the entire face, time-series data of features is stored, thereby resulting in a decrease in processing load and an increase in processing speed. Further, three-dimensional coordinates of features having large error are deleted. Accordingly, it is possible to improve the accuracy of 3D models as time elapses.

Experimental Results

Figure 19C:
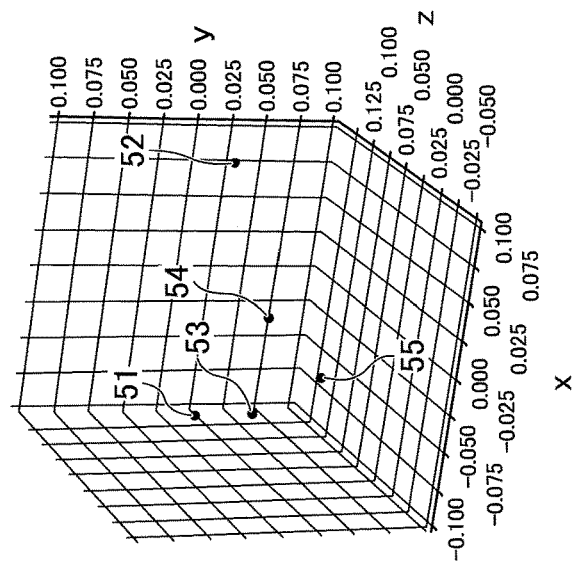
FIGS. 19A through 19C are plots illustrating an effect of the method for estimating three-dimensional coordinates performed by the facial feature detecting apparatus.
Figure 19B:
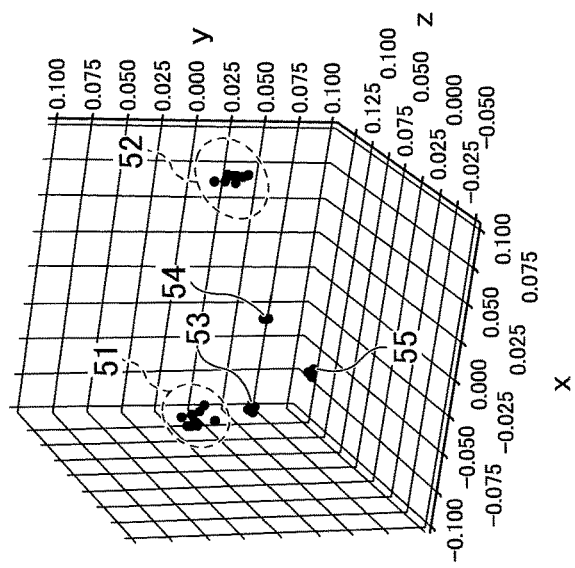
Figure 19A:
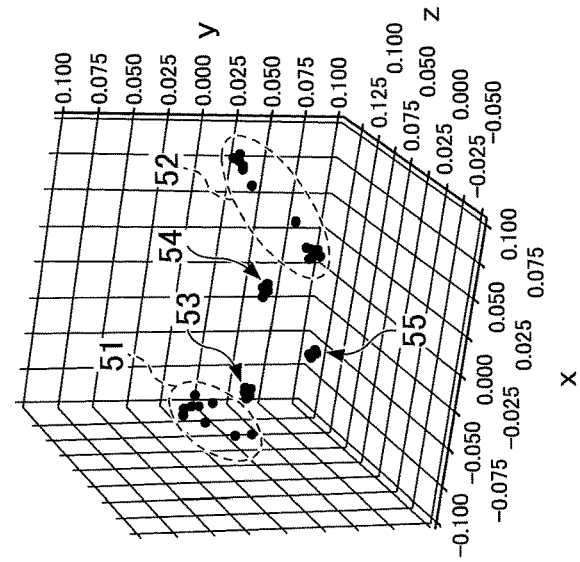

FIGS. 19A through 19C are plots illustrating an effect of the method for estimating three-dimensional coordinates performed by the facial feature detecting apparatus 10 according to the present embodiment. FIGS. 19A through 19C illustrate three-dimensional scatter plots of time-series data of 50 feature points. FIG. 19A illustrates 3D models without the filtering. FIG. 19B illustrates 3D models subjected to the filtering, in which features having large error are not deleted. FIG. 19C illustrates 3D models subjected to the filtering, in which features having large error are deleted.

In the 3D models illustrated FIG. 19A, it can be seen that positional variations in the right eye 53, the left eye 54, and the nasal tip 55 are small, but positional variations in the right ear 51 and the left ear 52 are large due to misdetection. In the 3D models illustrated FIG. 19B, misdetection is eliminated, and positional variations in the right ear 51 and the left ear 52 are small. Further, in the 3D models illustrated FIG. 19C, it can be seen that almost no position error is observed in the right ear 51 and the left ear 52, and variations are reduced.

Figure 20C:
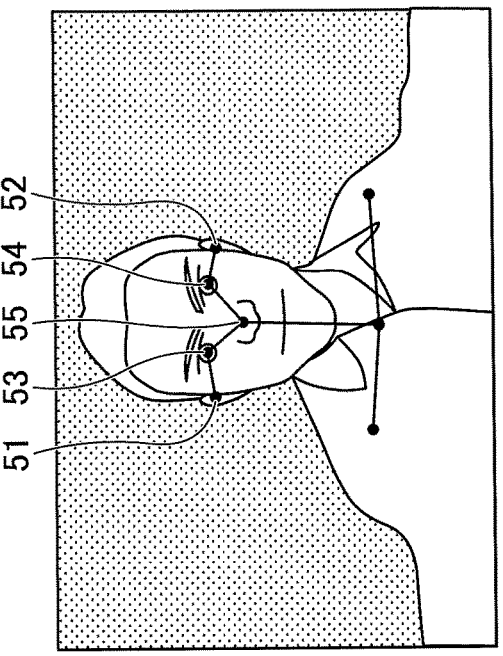
FIGS. 20A through 20D are diagrams illustrating 3D models superimposed on three-dimensional data of the face and body generated from face images.
Figure 20D:
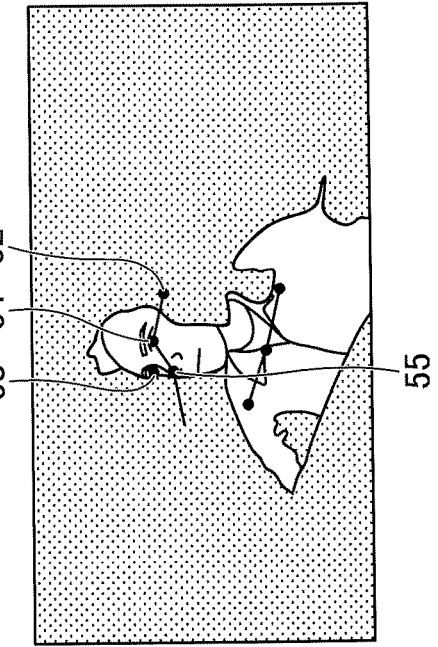
Figure 20A:
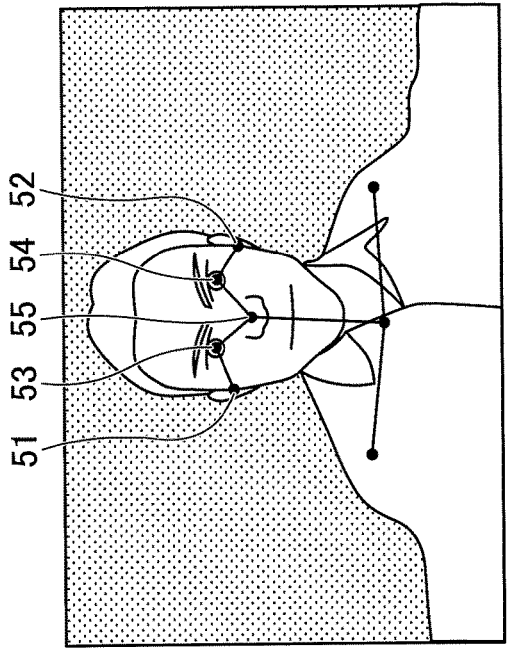
Figure 20B:
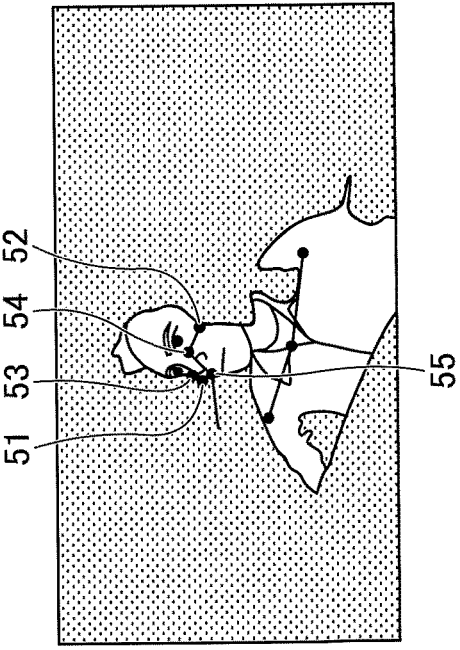

FIGS. 20A through 20D are diagrams illustrating 3D models superimposed on three-dimensional data of the face and body generated from face images. FIG. 20A and FIG. 20B illustrate an example in which no filtering is performed, and the cheek is mistakenly detected as the left ear 52 (the detected position of the left ear 52 is different from the actual position).

FIG. 20C and FIG. 20D illustrate an example in which the filtering is performed, and in which the left ear 52 is accurately detected.

Summary

Three-dimensional coordinates of a feature of an accumulated 3D model are acquired in accordance with the estimated face direction or position, and are used for an invisible feature or a feature with low detection accuracy. Accordingly, the position of the feature can be stably obtained regardless of the face direction.

In the related-art technique, only an approximate position (no individual differences are considered) can be estimated by using the 2D camera. According to the present embodiment, it is possible to estimate the position of the occupant's ear with high accuracy (at a level of a few millimeters), as compared to the related-art technique (with an accuracy level of a few tens of millimeters).

In the related-art technique, in order to take individual differences into account, it is required to estimate an approximate position based on the position of the eyes, or preliminarily measure the positions of the eyes or ears of each person. However, in the present embodiment, the position of the occupant's ear can be directly estimated without pre-measurement.

Because 3D models of features are created, the amount of memory used and the amount of calculation can be reduced, thereby achieving an inexpensive system.

Other Application Examples

Although the embodiments of the present invention have been described in detail, the present invention is not limited to the above-described embodiments. Various variations and modifications may be made to the described subject matter without departing from the scope of the present invention.

Figure 21A:
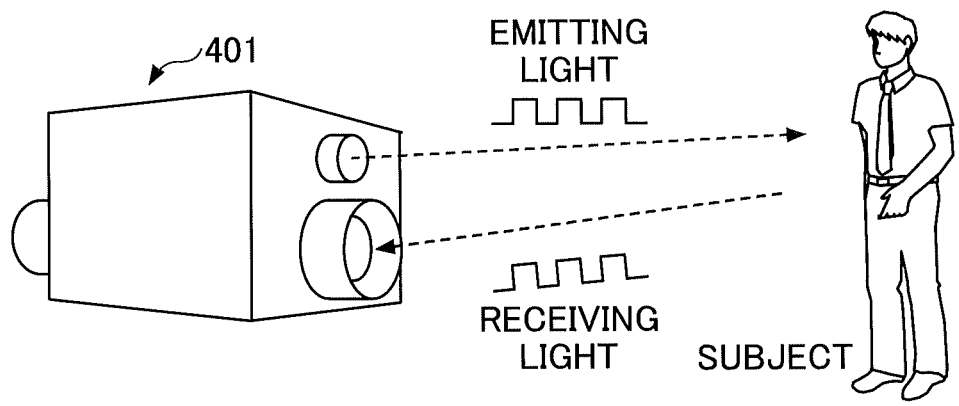
FIGS. 21A and 21B are diagrams illustrating a time-of-flight (TOF) camera and face shapes obtained by a high-definition depth sensor.

For example, in the above-described embodiments, as the feature sensor, the color camera (or the infrared camera) and the depth sensor (the rangefinder) are used, but a time-of-flight (TOF) camera may be used. FIG. 21A is a perspective view of a TOF camera 401. The TOF camera 401 is a range imaging camera capable of measuring the distance between the camera and a subject based on the time required for pulsed near infrared light to reach the subject and reflect back onto the camera. Thus, image data and distance information are obtained at one time.

Figure 21B:
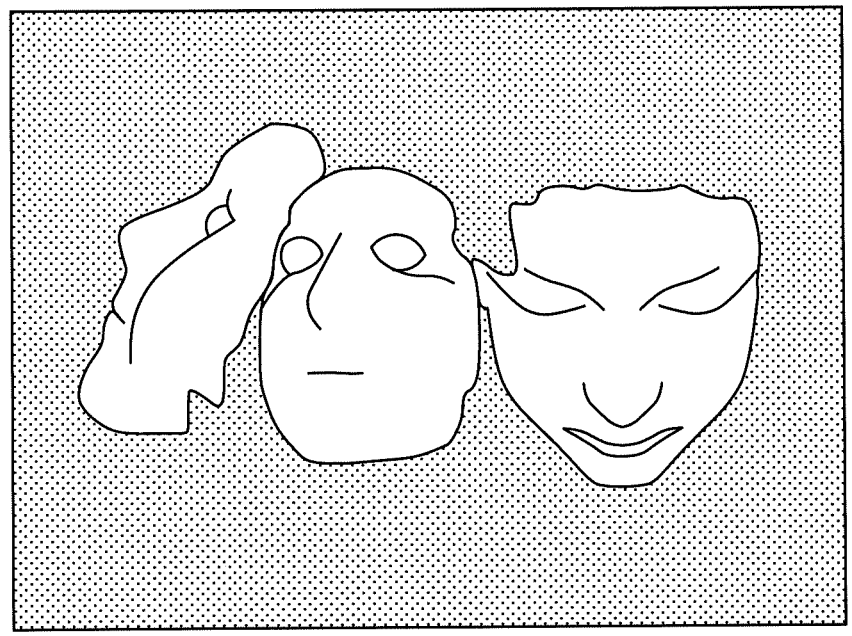

Further, if the depth sensor is a high-definition depth sensor capable of extracting facial features such as facial irregularities, the depth sensor can be used alone to detect features without the 2D camera. FIG. 21B is a diagram illustrating face shapes obtained by a high-definition depth sensor. Even in such face shapes, features can be detected from facial irregularities.

Further, in the first embodiment, the coordinates of the center of the eyes and the nasal tip are used to obtain the median line, but, the corners of the eyes, the nostrils, the corners of the mouth, the jaws, or other features may be used obtain the median line. However, face parts that do not change depending on the facial expression are preferably used. Further, the above-described embodiments can be applied not only to the ears but also to any bilaterally symmetrical features.

Further, in the above-described embodiments, the processes are performed by the facial feature detecting apparatus 10 mounted on the vehicle 8; however, some or all of the processes may be performed by a server. For example, the facial feature detecting apparatus 10 transmits face images to the server, and the server performs the process described with reference to FIG. 10. Alternatively, the server performs the process for accumulating 3D models described with reference to FIG. 15, or the process for obtaining three-dimensional coordinates described with reference to FIG. 18.

Further, in the above-described embodiments, the threshold is set for the face direction, and is used to determine whether to accumulate three-dimensional coordinates. However, instead of the threshold, weighting may be applied in accordance with the face direction, and the weighted mean may be used to determine whether to accumulate three-dimensional coordinates.

What is claimed is:

1. A facial feature detecting apparatus comprising:
   a feature sensor configured to acquire information on facial features of a subject;
   a feature detecting unit configured to detect the facial features including a first facial feature and a second facial feature of the subject from the information acquired by the feature sensor and determine whether the first facial feature and the second facial feature are detected;
   a three-dimensional coordinates calculating unit configured to calculate three-dimensional coordinates of the facial features of the subject; and
   a feature position estimating unit configured to estimate first three-dimensional coordinates of the first facial feature from second three-dimensional coordinates of the second facial feature of the detected facial features, on a basis that the first facial feature and the second facial feature are located at bilaterally symmetrical positions, wherein the facial feature detecting apparatus further comprises:
   a median line estimating unit configured to estimate a median line of a face of the subject, based on the three-dimensional coordinates of the detected facial features if the first facial feature is not detected and the second facial feature is detected,
   wherein, the feature position estimating unit estimates, as the first three-dimensional coordinates of the first facial feature, a position that is symmetrical to a position of the second facial feature of the detected facial features with respect to the median line, and
   wherein the facial feature detecting apparatus further comprises a 3D model accumulating unit configured to calculate an average of the second three-dimensional coordinates of the facial features accumulated in a 3D model storage at regular intervals for each facial feature type, and delete three-dimensional coordinates of a facial feature that is farthest from the average, from the 3D model storage.

2. The facial feature detecting apparatus according to claim 1,
   wherein the first and the second facial features are ears of the subject, and
   wherein the facial feature detecting apparatus further comprises an active noise control controller configured to perform an active noise control upon receiving the estimated first three-dimensional coordinates of the first facial feature and the detected second three-dimensional coordinates of the second facial feature.

3. A facial feature detecting apparatus comprising:
   a feature sensor configured to acquire information on facial features of a subject;
   a feature detecting unit configured to detect the facial features of the subject from the information acquired by the feature sensor;
   a three-dimensional coordinates calculating unit configured to calculate first three-dimensional coordinates of the facial features of the subject;
   a face direction estimating unit configured to estimate a face direction of the subject, based on the calculated first three-dimensional coordinates of the detected facial features;
   a 3D model information acquiring unit configured to acquire given three-dimensional coordinates of a given facial feature of the subject from a 3D model storage that accumulates second three-dimensional coordinates of the facial features of the subject in a frontal face direction; and
   a face direction rotating unit configured to cause the acquired given three-dimensional coordinates of the given facial feature of the subject to be rotated in the estimated face direction,
   wherein the facial feature detecting apparatus further comprises:
   a 3D model accumulating unit configured to accumulate, in the 3D model storage, the calculated second three-dimensional coordinates of the facial features of the subject in the frontal face direction, and
   wherein the 3D model accumulating unit calculates an average of the second three-dimensional coordinates of the facial features accumulated in the 3D model storage at regular intervals for each facial feature type, and deletes three-dimensional coordinates of a facial feature that is farthest from the average, from the 3D model storage.

4. The facial feature detecting apparatus according to claim 3, wherein, when the feature detecting unit is unable to detect the given facial feature of the subject from the information acquired by the feature sensor, the 3D model information acquiring unit acquires the given three-dimensional coordinates of the given facial feature of the subject from the 3D model storage.

5. The facial feature detecting apparatus according to claim 3, further comprising:
   a face direction reverse rotation unit configured to cause the facial features of the subject to be reversely rotated in accordance with the estimated face direction, and calculate the second three-dimensional coordinates of the facial features of the subject in the frontal face direction.

6. The facial feature detecting apparatus according to claim 5, wherein, when the estimated face direction is the frontal face direction, the 3D model accumulating unit does not accumulate, in the 3D model storage, second three-dimensional coordinates of an ear of the subject in the frontal face direction.

7. A facial feature detecting method comprising:
   acquiring, by a feature sensor, information on facial features of a subject;
   detecting, by a feature detecting unit, the facial features of the subject from the information acquired by the feature sensor;
   calculating, by a three-dimensional coordinates calculating unit, first three-dimensional coordinates of the facial features of the subject;
   estimating, by a face direction estimating unit, a face direction of the subject, based on the calculated first three-dimensional coordinates of the detected facial features;
   acquiring, by a 3D model information acquiring unit, given three-dimensional coordinates of a given facial feature of the subject from a 3D model storage that accumulates second three-dimensional coordinates of the facial features of the subject in a frontal face direction; and
   causing, by a face direction rotating unit, the acquired given three-dimensional coordinates of the given facial feature of the subject to be rotated in the estimated face direction,
   wherein the facial feature detecting method further comprises:

accumulating, in the 3D model storage, the calculated second three-dimensional coordinates of the facial features of the subject in the frontal face direction, calculating an average of the second three-dimensional coordinates of the facial features accumulated in the 3D model storage at regular intervals for each facial feature type, and deleting three-dimensional coordinates of a facial feature that is farthest from the average, from the 3D model storage, and calculating an average of the second three-dimensional coordinates of the facial features accumulated in the 3D model storage at regular intervals for each facial feature type, and deleting three-dimensional coordinates of a facial feature that is farthest from the average, from the 3D model storage.

* * * * *